US008773513B2

(12) United States Patent
Ding et al.

(10) Patent No.: US 8,773,513 B2
(45) Date of Patent: Jul. 8, 2014

(54) CONTEXT AND EPSILON STEREO CONSTRAINED CORRESPONDENCE MATCHING

(75) Inventors: Yuanyuan Ding, Santa Clara, CA (US); Jing Xiao, Cupertino, CA (US)

(73) Assignee: Seiko Epson Corporation, Tokyo (JP)

(*) Notice: Subject to any disclaimer, the term of this patent is extended or adjusted under 35 U.S.C. 154(b) by 349 days.

(21) Appl. No.: 13/175,114

(22) Filed: Jul. 1, 2011

(65) Prior Publication Data

US 2013/0002828 A1 Jan. 3, 2013

(51) Int. Cl.
*H04N 5/225* (2006.01)
*H04N 13/02* (2006.01)
*G02B 17/08* (2006.01)

(52) U.S. Cl.
CPC ..................... *G02B 17/08* (2013.01)
USPC ............................................ 348/49; 348/335

(58) Field of Classification Search
CPC .... G02B 17/08; G02B 17/0836; G03B 19/02; G06K 9/4671; G06T 15/205; H04N 13/0239; H04N 2013/0081
USPC .................................................. 348/49, 335
See application file for complete search history.

(56) References Cited

U.S. PATENT DOCUMENTS 6,711,293 B1 3/2004 Lowe

OTHER PUBLICATIONS

Ainouz et al. "Mirror-Adapted Matching of Catadioptric Images", Image Processing, 2008. ICIP 2008. 15th IEEE International Conference on.*
Morel et al "ASIFT: A new framework for fully affine invariant image comparison" SIAM Journal on Imaging Sciences, 2009.*
Morel, J-M, et al. "ASIFT: A New Framework for Fully Affine Invariant Image Comparison", SIAM J. Imaging Sciences, vol. 2, No. 2, pp. 438-469, 2009.
Noury, N., et al., "How to Overcome Perceptual Aliasing in ASIFT?", 6th International Symposium on Visual Computing ISVC, version 1, Sep. 6, 2010.
Ding, Y., et al., "Epsilon Stereo Pairs", British Machine Vision Conference (BMVC), 2007.
Lowe, D.G., "Distinctive Image Features from Scale-Invariant Keypoints", International Journal of Computer Vision, 2004.

* cited by examiner

*Primary Examiner* — Jay Patel
*Assistant Examiner* — Frank Huang

(57) ABSTRACT

A catadioptric camera having a perspective camera and multiple curved mirrors, images the multiple curved mirrors and uses the epsilon constraint to establish a vertical parallax between points in one mirror and their corresponding reflection in another. An ASIFT transform is applied to all the mirror images to establish a collection of corresponding feature points, and edge detection is applied on mirror images to identify edge pixels. A first edge pixel in a first imaged mirror is selected, its nearest feature points are identified, and a rigid transform is applied to them. The rigid transform is fitted to corresponding feature points in a second imaged mirror. The closest edge pixel to the expected location as determined by the fitted rigid transform is identified, and its distance to the vertical parallax is determined. If the distance is not greater than predefined maximum, then it is deemed correlate to the edge pixel in the first imaged mirror.

18 Claims, 28 Drawing Sheets

CONTEXT AND EPSILON STEREO CONSTRAINED CORRESPONDENCE MATCHING

BACKGROUND

1. Field of Invention

The present invention generally relates to matching pixel points in multiple images having different view angles, and more specifically relates to edge pixel matching in multiple images taken with catadioptric cameras.

2. Description of Related Art

Edge detection algorithms are part of many image manipulation operations. Edge detection is fundamental to image processing and computer vision, particularly in the areas of feature detection and feature extraction. Edge detection aims to identify points, i.e. pixels that outline objects within an image. There are many edge detection algorithms, but generally they attempt to identify pixels at which discontinuities occurs, i.e. where the image brightness changes sharply. In the ideal case, the result of applying an edge detector to an image leads to a set of connected curves that indicate the boundaries of objects, the boundaries of surface markings, and discontinuities in surface orientation. Once the boundaries have been identified, various image processing operations may be applied to the digital image.

For example FIG. 1A shows a typical digital image, and FIG. 1B shows the results of applying edge detection to the image of FIG. 1A. Edge detection may be designed to identify thick or thin lines, or may be optimized to separately identify thick and thin lines. In the example of FIG. 1B, both thick and thin lines are separately identified, which permits them to be separately processed. This permits the processing of the digital image to be more specialized by adjusting the size of a pixel-processing window according to line thickness. As a result, application of a specific image processing algorithms, such a bilateral filter, may be optimized along the edge of objects according to line thickness to achieve a sharper final image, as shown in FIG. 1C.

Another use of edge detection is feature detection. As an example, if one has a library of identifying features of a specific object, then one may search an input digital image for those identifying features in an effort to determine if an example of the specific object is present in the input digital image. When this is extended to multiple digital images of a common scene taken from different view angles, it is possible to index, i.e. match or correlate, feature points from one image to the other. This permits the combined processing of the multiple digital images.

For example in FIG. 2, images 2, 4, 6 and 8 each provide partial, and overlapping, views of a building in a real-world scene, but none provide a full view of the entire building. However, by applying edge detection and indexing (i.e. identifying matching pairs of) feature points in the four partial images 2, 4, 6 and 8 that correlate to the same real feature point in the real-world scene, it is possible to stitch together the four partial images (i.e. applying an image stitching tool) to create one composite image 10 of the entire building. The four partial images 2-8 of FIG. 2 are taken from the same view angle, but this approach may be extended to the field of correspondence matching, where images of a common scene are taken from different view angles.

In the field of computer vision, correspondence matching (or the correspondence problem) refers to the matching of objects (or object features or feature points) common to two, or more, images. Correspondence matching tries to figure out which parts of a first image correspond to (i.e. are matched to) which parts of a second image, assuming that the second image was taken after the camera had moved, time had elapsed, and/or the pictured objects had moved. For example, the first image may be of a real-world scene taken from a first view angle with a first field of vision, FOV, and the second image may be of the same scene taken from a second view angle with a second FOV. Assuming that the first and second FOVs at least partially overlap, correspondence matching refers to the matching of common features points in the overlapped portions of the first and second images.

Correspondence matching is an essential problem in computer vision, especially in stereo vision, view synthesis, and 3D reconstruction. Assuming that a number of image features, or objects, in two images taken from two view angles have been matched, epipolar geometry may be used to identify the positional relationship between the matched image features to achieve stereo view, synthesis or 3D reconstruction.

Epipolar geometry is basically the geometry of stereo vision. For example in FIG. 3, two cameras 11 and 13 create 2D images 15 and 17, respectively, of a common 3D scene 10 consisting of a larger sphere 19 and a smaller sphere 21. 2D images 15 and 17 are taken from two distinct view angles 23 and 25. Epipolar geometry describes the geometric relations between points in 3D scene 10 (for example spheres 19 and 21) and their relative projections in 2D images 15 and 17. These geometric relationships lead to constraints between the image points, which are the basis for epipolar constraints, or stereo constraints, described more fully below.

FIG. 3 illustrates a horizontal parallax where, from the view point of camera 11, smaller sphere 21 appears to be in front of larger sphere 19 (as shown in 2D image 15), but from the view point of camera 13, smaller sphere 21 appears to be some distance to the side of larger sphere 19 (as shown in 2D image 17). Nonetheless, since both 2D images 15 and 17 are of a common 3D scene 10, both are truthful representations of the relative positions of larger sphere 19 and smaller sphere 21. The geometric positional relationships between camera 11, camera 13, smaller sphere 21 and larger sphere 19 thus establish geometric constraints on 2D images 15 and 17 that permit one to reconstruct the 3D scene 10 given only the 2D images 15 and 17, as long as the epipolar, or stereo, constraints are known.

Epipolar geometry is based on the pinhole camera model, a simplified representation of which is shown in FIG. 4. In the pinhole camera model, cameras are represented by a point, such as left point $O_L$ and right point $O_R$, at each respective camera's focal point. Point P represents the point of interest in the 3D scene being imaged, which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of a an inverted captured image, two virtual image planes, ImgL and ImgR, are shown in front of their respective focal points, $O_L$ and $O_R$, to show non-inverted representations of captured images. Point $P_L$ is the 2D projection of point P onto left virtual image ImgL, and point $P_R$ is the 2D projection of point P onto right virtual image ImgR. This conversion from 3D to 2D may be termed a perspective projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 31.

Line 27, from focal $O_L$ to point P is seen as a single point, $P_L$ in virtual image plane ImgL, because point P is directly in front of focal point $O_L$. This is similar to how image 15 of camera 11, in FIG. 3, shows smaller sphere 21 in front of larger sphere 19. However, from focal point $O_R$, the same line 27 from $O_L$ to point P is seen a displacement line 33 from image point $E_R$ to point $P_R$. This is similar to how image 17 of camera 13, in FIG. 3, shows smaller sphere 21 displaced to the side of larger sphere 19. This displacement line 33 may be termed an epipolar line. Conversely from focal point $O_R$, line 29 is seen as a single point $P_R$ in virtual image plane ImgR, but from focal point $O_L$ line 29 is seen as displacement line, or epipolar line, 35 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 33 on the right virtual image plane ImgR is known by epipolar geometry. Furthermore, point P must projects onto the right virtual image plane ImgR at a point $P_R$ that lies on this specific epipolar line, 33. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point P, then their projection lines 27 and 29 must intersect precisely at 3D point P. This means that the position of 3D point P can be calculated from the 2D coordinates of the two projection points $P_L$ and $P_R$. This process is called triangulation.

As is explained above, however, epipolar geometry and the stereo constraint are based on the pinhole camera model, and thus do not apply to cameras that do not adhere to the pinhole camera model. Consequently, the availability of corresponding matching tools for non-pinhole cameras has been limited.

Examples of cameras that do not adhere to the pinhole model are orthographic cameras, pushbroom cameras, cross-slit cameras and catadioptric cameras. Such cameras, however, typically provide a larger field of vision than is possible with pinhole cameras.

It would be desirable to facilitate the extension of correspondence matching to the larger field of vision available to non-pinhole cameras, and in particular to catadioptric cameras.

SUMMARY OF INVENTION

The present invention is embodied in a method of matching first pixels in a first image of a 3D scene to corresponding second pixels in a second image of the same 3D scene, the method having: (a) obtaining the first image and the second image, wherein the first image is a first multi-perspective image and the second image is a second multi-perspective image; (b) defining an index of matched pixel pairs; (c) identifying a plurality of target pixels in the first image to be matched to pixels in the second image; (d) for each identified target pixel: (i) determining its potential corresponding pixel in the second image; (ii) determining a vertical parallax in the second image for the for the identified target pixel, the vertical parallax being distinct from any horizontal parallax; (iii) determining the minimum distance from the potential corresponding pixel to the vertical parallax, and (iv) IF the minimum distance is not greater than a predefined maximum distance, THEN deeming the potential corresponding pixel to be a true match for the identified target pixel and adding the pixel pair comprised of the potential corresponding pixel and the identified target pixel to the index of matched pixel pairs, ELSE deeming the potential corresponding pixel to not be a match for the identified target pixel and omitting the target pixel and the potential corresponding pixel from the index of matched pairs.

In this method, step (c) includes applying an affine scale-invariant feature transform (ASIFT) to the first and second images to render a collection of feature point pairs, each feature point pair including a first feature point in the first image and a corresponding second feature point in the second image, and the first feature points being the plurality of target pixels; in step (i) the potential corresponding pixel of each identified target pixel is the second feature point that makes up the feature point pair of the identified target pixel; in step (iv), the index of matched pairs overrides the correspondence index matches produced by the ASIFT.

Additionally, the vertical parallax is defined by an epsilon stereo constraint. Optionally, the predefined maximum distance is a distance defined by 5 adjacent pixel positions.

Further preferably, in step (c), the plurality of target pixels are edge pixels identified by application of an edge detection algorithm.

In this case, step (c) further includes applying a feature based correspondence matching algorithm to the first and second images to render a collection of feature point pairs, each feature point pair including a first feature point in the first image and a corresponding second feature point in the second image; and step (i) includes: (I) identifying N first feature points nearest to a current target pixel, wherein N is a fixed, predefined number; (II) defining a rigid transform T(.) for the current target pixel using the identified N first feature points; (III) fitting the rigid transform to the corresponding N second feature points in the second image, identifying an edge pixel in the second image that is nearest to an expected position relative to the N second feature points as determined from the fitted rigid transform, the identified nearest edge pixel T(p) being the potential corresponding pixel.

Additionally, the edge detection algorithm is applied to the first and second images, and in step (III) the identified an edge pixel is selected among the edge detected pixels identified by the edge detection algorithm. Furthermore, N is preferably not more than 25.

It is noted that in the above embodiment, the first and second multi-perspective images are catadioptric images.

The present invention is also embodied in a method of matching edge pixels in a first image of a 3D scene to corresponding edge pixels in a second image of the same 3D scene, the method having: (a) obtaining the first image and the second image, wherein the first image is a first catadioptric image and the second image is a second catadioptric image; (b) applying an affine scale-invariant feature transform (ASIFT) to the first and second catadioptric images to render a collection of feature point pairs, each feature point pair including a first feature point in the first image and a corresponding second feature point in the second image; (c) applying edge pixel detection to the first and second catadioptric images; (d) identifying as a target pixel, in turn, each detected edge pixel in the first image, and for each identified target pixel: (I) determining its vertical parallax in the second image, the vertical parallax being distinct from any horizontal parallax; (II) identifying N first feature points nearest to the target pixel, wherein N is a fixed, predefined number; (III) defining a rigid transform T(.) for the current target pixel using the identified N first feature points; (IV) fitting the rigid transform to N corresponding second feature points in the second image that correspond to the N first feature points of the first image, identifying a detected edge pixel in the second image that is nearest to the expected position of a corresponding target pixel relative to the N second feature points in the second image as determined from the fitted rigid transform, the identified closest edge pixel T(p) being a potential corresponding pixel; (V) determining the minimum distance from the potential corresponding pixel to the vertical parallax; and (VI) IF the minimum distance is not greater than a predefined maximum distance, THEN deeming the potential corresponding pixel to be a true match for the identified target pixel and retaining the edge pixel pair comprised of the potential corresponding pixel and the identified target pixel, ELSE deeming the potential corresponding pixel to not be a match for the identified target pixel, and discarding the edge pixel pair comprised of the potential corresponding pixel and the identified target pixel.

In this method, prior to step (d), step (b) preferably includes: for each feature point pair, (ii) determining a vertical parallax in the second image for the first feature point, the vertical parallax being distinct from any horizontal parallax; (iii) determining the minimum distance from the second feature point to the vertical parallax, and (iv) IF the minimum distance is not greater than a predefined maximum distance, THEN deeming the first feature point to be a true match for the second feature point and retaining the feature point pair, ELSE deeming the first feature point to not be a match for the second feature point and removing the feature point pair from the collection of feature point pairs.

In this approach, the vertical parallax is defined by an epsilon stereo constraint. Also, the predefined maximum distance is a distance defined by 5 adjacent pixel positions. Furthermore, N is preferably 25.

This method may also include, in step (a), obtaining first and second catadioptric images includes calibrating a first catadioptric camera and a second catadioptric camera, each catadioptric camera being defined by a curved mirror and a perspective camera; the first catadioptric image being imaged by the first catadioptric camera and the second catadioptric image being imaged by the second catadioptric camera.

In this case, the perspective camera is a pinhole camera; and the first catadioptric cameras is defined by a first curved mirror, the second catadioptric cameras is defined by second curved mirror, and the first and second catadioptric cameras share the same pinhole camera; and the image reflected from the first mirror provides a first field of vision, and the image reflected from the second mirror provides a second field of vision that at least partially overlaps the first field of vision.

The present invention is also embodied by a catadioptric camera system, having: a first plurality of curved mirrors; a first perspective camera with a field of vision encompassing the first plurality of curved mirrors, the first camera being configured to image the first plurality of curved mirrors simultaneously, each curved mirror providing a respective catadioptric image; a data processing device for applying the following steps to a given pair of first and second catadioptric images: (b) applying an affine scale-invariant feature transform (ASIFT) to the first and second catadioptric images to render a collection of feature point pairs, each feature point pair including a first feature point in the first image and a corresponding second feature point in the second image; (c) applying edge pixel detection to the first and second catadioptric images; (d) identifying as a target pixel, in turn, each detected edge pixel in the first image, and for each identified target pixel: (I) determining its vertical parallax in the second image, the vertical parallax being distinct from any horizontal parallax; (II) identifying N first feature points nearest to the target pixel, wherein N is a fixed, predefined number; (III) defining a rigid transform T(.) for the current target pixel using the identified N first feature points; (IV) fitting the rigid transform to the N corresponding second feature points that constitute the feature point pair of each of the N first feature points, identifying a detected edge pixel in the second image that is nearest to the expected position of a corresponding target pixel relative to the N second feature points as determined from the fitted rigid transform, the identified closest edge pixel T(p) being a potential corresponding pixel; (V) determining the minimum distance from the potential corresponding pixel to the vertical parallax; and (VI) IF the minimum distance is not greater than a predefined maximum distance, THEN deeming the potential corresponding pixel to be a true match for the identified target pixel, and retaining the edge pixel pair comprised of the potential corresponding pixel and the identified target pixel, ELSE deeming the potential corresponding pixel to not be a match for the identified target pixel, and discarding the edge pixel pair comprised of the potential corresponding pixel and the identified target pixel.

Preferably in this catadioptric camera, the predefined maximum distance is a distance defined by 5 adjacent pixel positions, and N is 25.

Further preferably, the plurality of curved mirrors forms an array of curved mirrors; and the perspective camera and array of curved mirrors are calibrated to each other.

Further preferably, the catadioptric camera system further includes; a second plurality of curved mirrors; a second perspective camera with a field of vision encompassing the second plurality of curved mirrors, the second camera being configured to image the second plurality of curved mirrors simultaneously, each curved mirror providing a respective catadioptric image; wherein: the field of vision (FOV) of the second perspective camera at least partially overlaps the FOV of the first perspective camera, and the FOV of the first perspective camera at least overlaps the FOV of the second perspective camera; and in the given pair of first and second catadioptric images, the first catadioptric image is imaged from a mirror in the first plurality of curved mirrors, and the second catadioptric image is imaged from a mirror in the second plurality of curved mirrors.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

Correspondence matching is an essential problem in computer vision, especially in stereo, view synthesis, and 3D reconstruction. Such applications make use of epipolar geometry and are subject to the stereo constraint, which generally applies only camera setups that adhere to the pinhole camera model.

Catadioptric cameras do not adhere to the pinhole camera model. Consequently, a strict stereo constraint may not exist for such cameras. In general, catadioptric optical systems combine refraction and reflection in an optical system by means of lenses (dioptrics) and curved mirrors (catoptrics). Multi-perspective catadioptric cameras, and camera setups, have an advantage of a wider field of vision, FOV, than is achievable with pinhole camera model setups.

Figure 5:
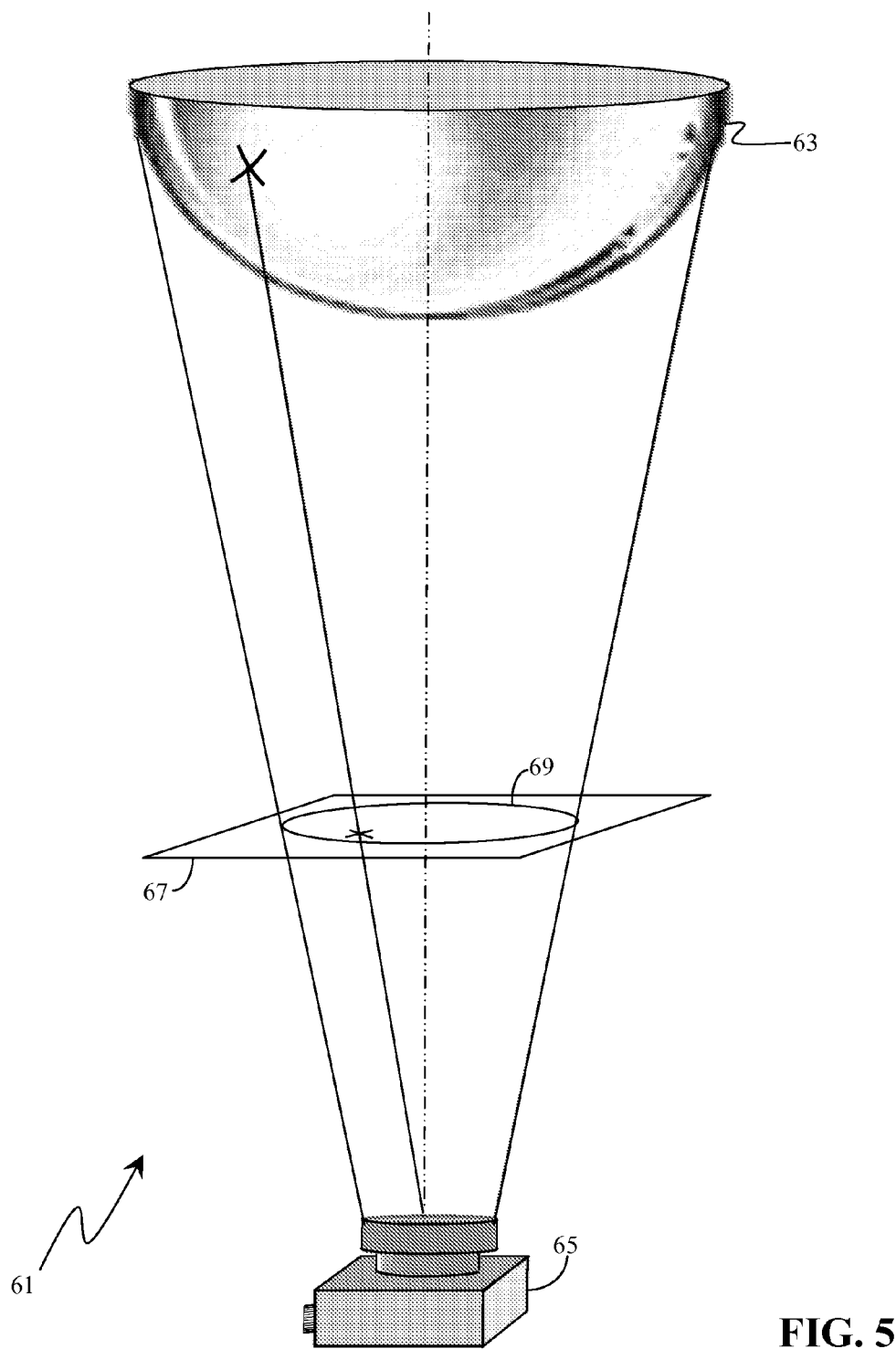
FIG. 5 illustrates a simplified example of a catadioptric camera setup.

A simplified example of a catadioptric camera setup 61 is shown in FIG. 5. A perspective camera 65 (or a single-perspective camera, such as a pinhole camera, for creating 2D perspective projection images of 3D scenes) combined with a curved mirror 63 constitutes a basic catadioptric (or catadioptric omnidirectional) camera. Curved mirror 63, which may be parabolic or hyperbolic, increases the field of vision of camera 65, but distorts the image captured by camera 65. For illustration purposes, a virtual image plane 67 is shown in front of camera 65 with a simplified projection outline 69. The system typically requires calibration of the camera 65 and mirror 63, which relates a 3D vector emanating from the mirror 63 to a 2D pixel point (such as the center of the projected x-shaped maker from mirror 63) on virtual image plane 67.

There are a few basic types of catadioptric cameras. With reference to FIG. 6A, a camera-mirror system is a central system when optical rays 71a-71d from the camera 76 (represented by the camera's focal point) reflect on mirror 73 and intersect at a unique point 75, which constitutes a single effective view point.

Central catadioptric cameras thus have a single effective viewpoint. Some prior art attempts have been made towards extending stereo properties to central catadioptric cameras by manipulating a captured image to compensate for the image distortion caused by curved mirror 73. However, such systems typically require that the camera and mirror axes be carefully aligned, and that the mirror be rotationally symmetrical with respect to its axis. This limits its application.

Figure 6B:
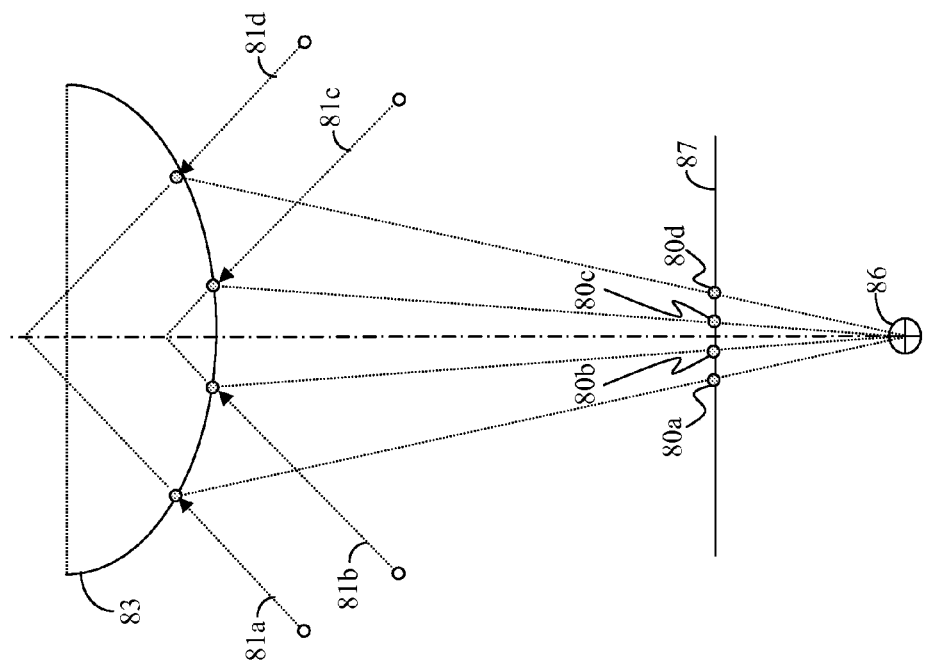
FIGS. 6A to 6C illustrate three types of catadioptric cameras.
Figure 6A:
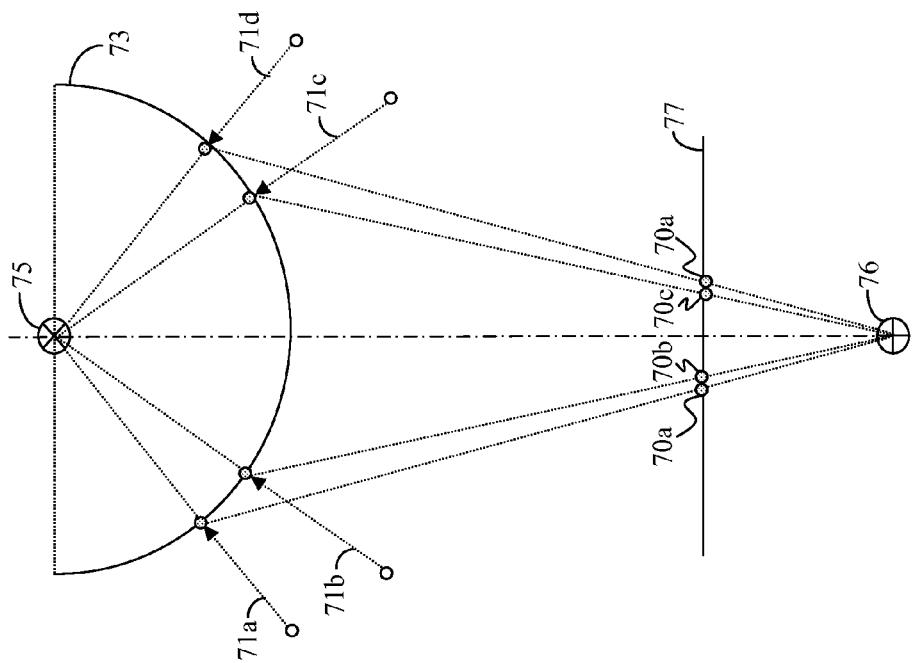
Figure 6C:
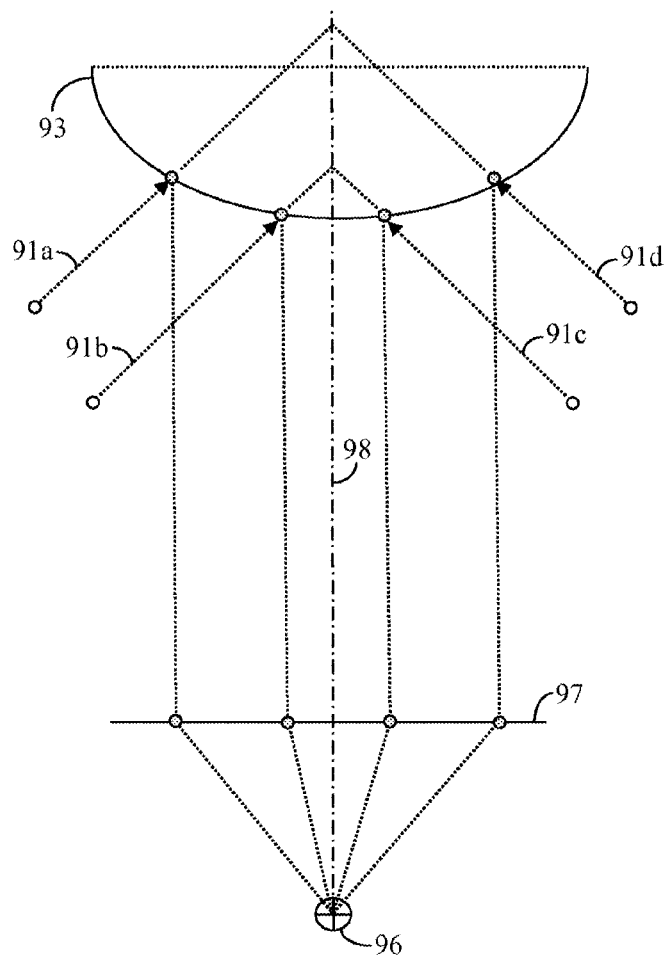

Another type of catadioptric camera is the non-central (i.e. non-single effective viewpoint) system, as illustrated in FIG. 6B. In this case, optical rays 81a to 81c from camera 86 that reflect on mirror 83 do not intersect into a unique point. Non-central catadioptric cameras would be easier and less costly to construct than central catadioptric camera, but non-central catadioptric cameras complicate any attempts to apply stereo constraints. It is worth noting that the projected points 70a-70d on the image plane 77 of central catadioptric camera 76 would be distorted differently than the projection points 80a-80d on the image plane 87 of non-central catadioptric camera 86.

If using a parabolic mirror in a non-central catadioptric camera, as shown in FIG. 5C, reflected rays 91a-91d coming from a real-world scene to the camera 96 are parallel to the axis 98 of the mirror 93. Because the parallel rays 91a-91d do not converge towards the camera's optical center 96, an orthographic lens 97 would be placed between the camera and mirror 93 to focus the image on the camera's CCD plane at the camera's optical center 96.

In spite of the difficulties in computer analyzing (i.e. digital processing of) images from catadioptric cameras, the use of catadioptric cameras (including those having an array of adjacent curved mirrors) in automated systems is desirable because of their increased field of vision and simplicity of setup.

Figure 7:
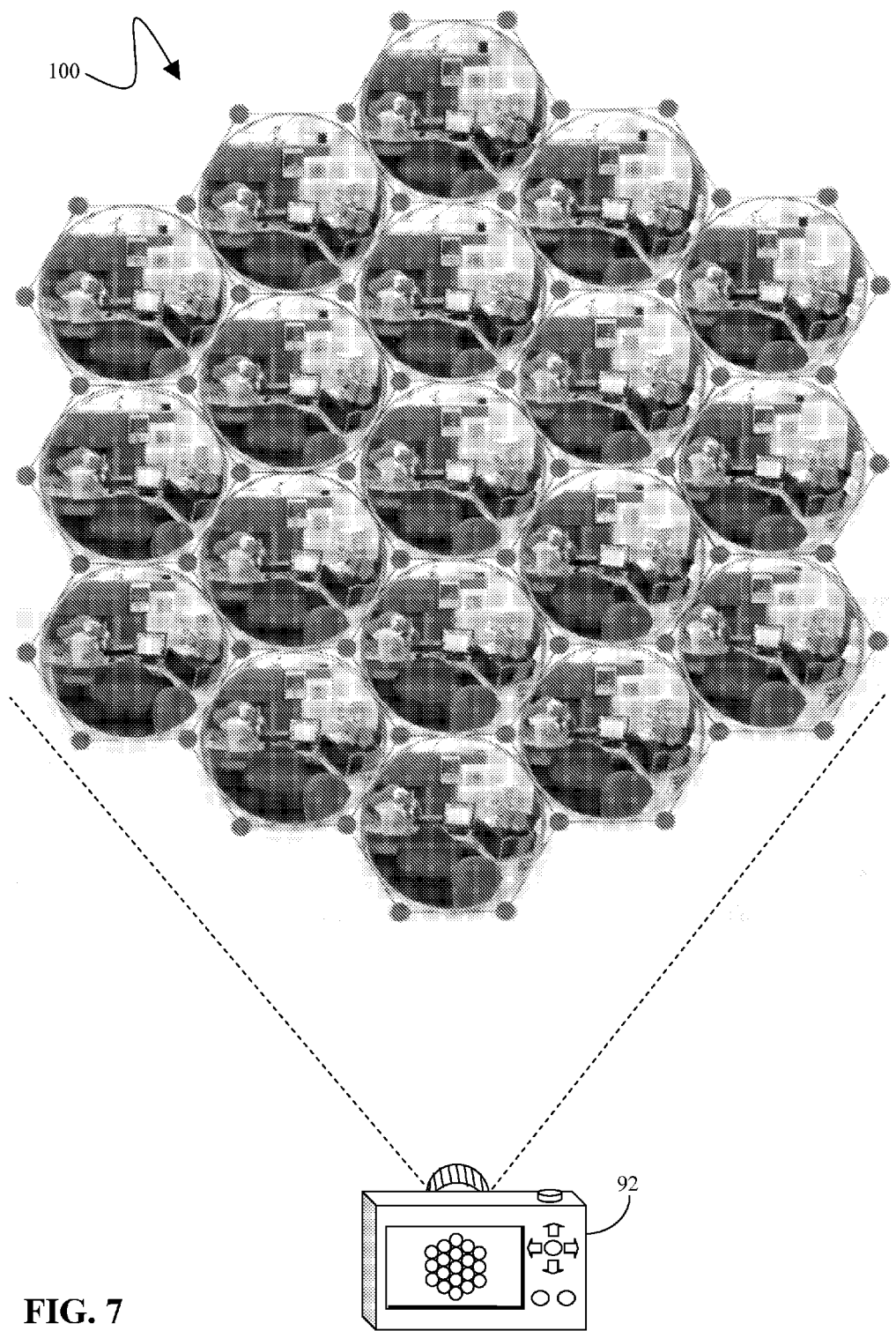
FIG. 7 illustrates an example of a real-world catadioptric camera setup.

With reference to FIG. 7, an example of a real-world catadioptric camera setup may make use of plurality (an array of) curved mirrors 100 and at least one camera 92. In the present example, each of mirrors 100 has a circular circumference and a warped (i.e. parabolic or otherwise curved) surface, and camera 92 is configured such that it images (i.e. photographs or captures) the reflected images of all mirrors 100 simultaneously. If desired, however, camera 92 may be configured to image a subset of mirrors 100 at a time, or a separate camera may be provided per mirror.

Further alternatively, multiple cameras may be used in a setup where each of the multiple cameras separately images a subset of the mirrors 100. In this case, each subset of mirrors corresponding to each camera may optionally have some overlap of mirrors with an adjacent subset. Alternatively, each subset of mirrors may be independent of all others.

Figure 8:
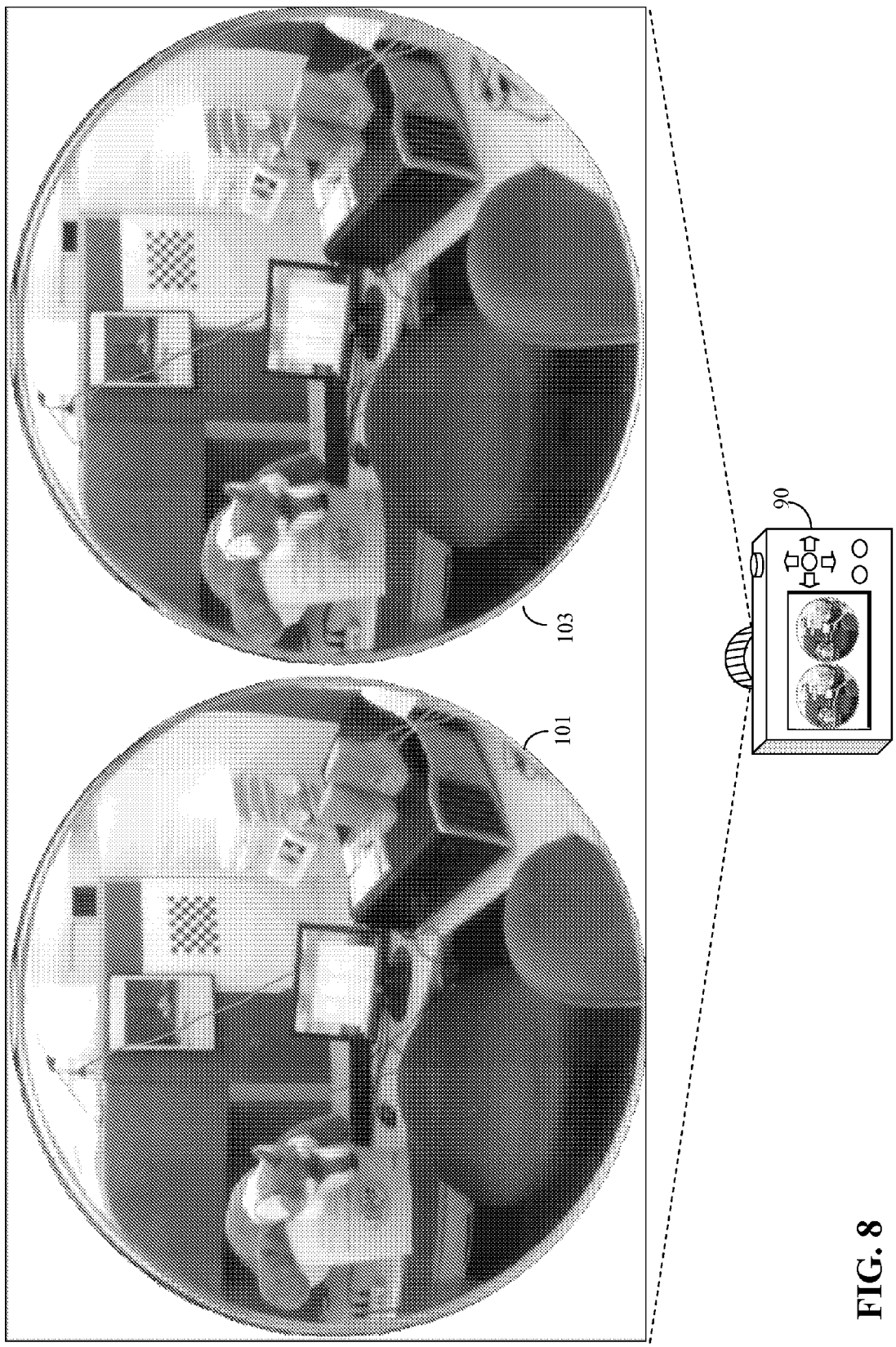
FIG. 8 shows a preferred catadioptric camera setup with only two rounded mirrors and one perspective camera.

For ease illustration, FIG. 8 shows a preferred setup with only two rounded mirrors 101 and 103 and one camera 90. Preferably, mirrors 101 and 103 are part of a non-central catadioptric camera setup, with camera 90 capturing both mirrors 101 and 103 simultaneously.

It should be noted that the following discussion is equally applicable to catadioptric systems having one or more mirrors and/or more cameras, and may be applied to central catadioptric cameras and catadioptric cameras using parabolic mirrors.

Catadioptric systems achieve a wide field of vision with a minimal number of cameras, but because of image distortion due to their curved mirrors, the stereo constraint (and epipolar geometry) is generally not applicable to catadioptric cameras. Thus, the methods of feature point matching, and more specifically edge point matching by means of the stereo constraint described above are not well suited to catadioptric systems. A better choice for catadioptric systems would be a method of identifying feature points that does not rely on stereo constraints. Feature based correspondence matching is such a method.

Consequently, feature based correspondence matching algorithms have been applied in the past to catadioptric cameras to identify features of specific objects. Examples of feature based correspondence matching algorithms are SIFT and Affine SIFT. It is noted, however, that feature based correspondence matching algorithms such as SIFT and Affine SIFT purposely exclude edge points from their analysis, and thus are not well suited for edge detection. Nonetheless, Applicants have found that feature based correspondence matching algorithms may be used in combination with an edge detection algorithm in a catadioptric camera as part of an overall process to index (i.e. match) edge points from two catadioptric images (i.e. images taken with catadioptric cameras). More specifically, the presently preferred embodiment indexes, i.e. matches, edge boundary points of an object in one curved mirror to an image of the same object in another curved mirror. In this manner, feature objects in one curved mirror may be matched to the same feature objects in another curved mirror.

The scale-invariant feature transform, SIFT, identifies points of interest, or feature points, in a 2D image, as is well known in the art. A discussion of the SIFT transform is provided in U.S. Pat. No. 6,711,293 to Lowe. Essentially, SIFT uses a library of training images to identify feature points that are characteristic of a specific object. Once a library of the object's characteristic feature points have been identified, the feature points can be used to determine if an instance of the object is found in a newly received image.

Principally, feature points (i.e. points of interest) of the object are extracted to provide a "feature description" of a specific object. This description, extracted from training images, can then be used to identify the specific object in a test image containing many object-types. To perform reliable recognition, it is preferred that the features extracted from the training images be detectable under changes in image scale, noise, illumination, and rotation. Feature points usually lie near high-contrast regions of the image.

Another important characteristic of these feature points is that the relative positions between them in the original scene shouldn't change from one image to another. For example, if only the four corners of a door were used as feature points, they would work regardless of the door's position; but if points in the frame were also used, the recognition would fail if the door is opened or closed. Similarly, feature points located in articulated or flexible objects would typically not work if any change in their internal geometry happens between two images in the set being processed. SIFT detects and uses a large number of feature points from the images, which reduces the contribution of the errors caused by these local variations in the average error of all feature matching errors.

In a SIFT application, feature points of objects are first extracted from a set of training images and stored in a database. An object is recognized in a new image by individually comparing each feature point from the new image to this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

Figure 9:
FIG. 9 illustrates an example of a SIFT determination of feature points.

An example of a SIFT determination of feature points is illustrated in FIG. 9. Possible feature points are first identified, as indicated by dark dots in image 31. Possible feature points that have a low contrast are then discarded, as illustrate in image 33. Finally, possible features points located on edges are removed, which leaves the final set of feature points shown in image 35.

Figure 1A:
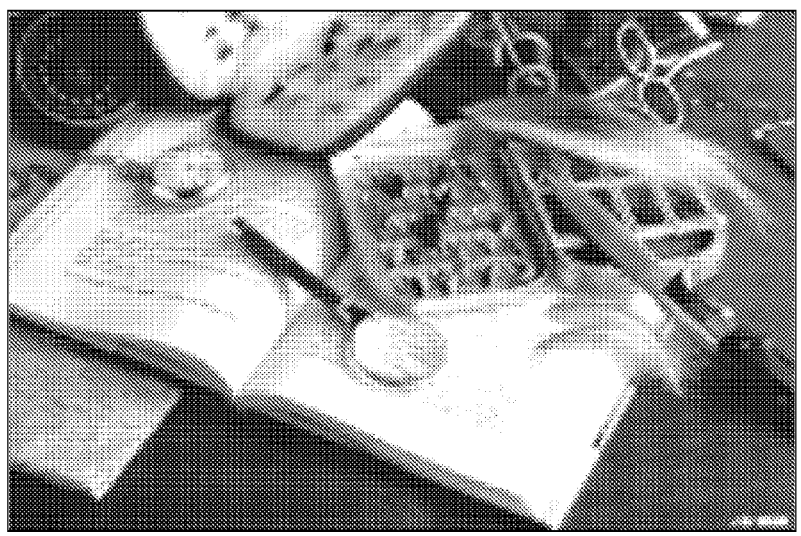
FIGS. 1A to 1C illustrate the use of edge detection in an image enhancement application.
Figure 1B:
Figure 1C:
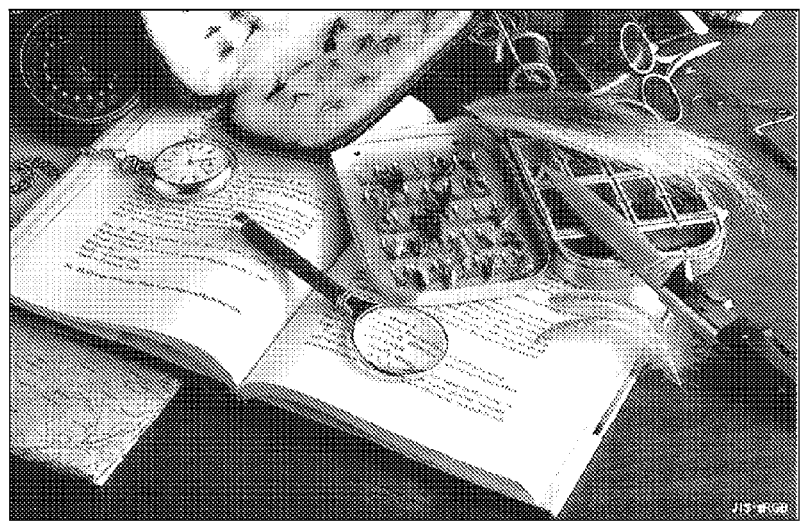
Figure 2:
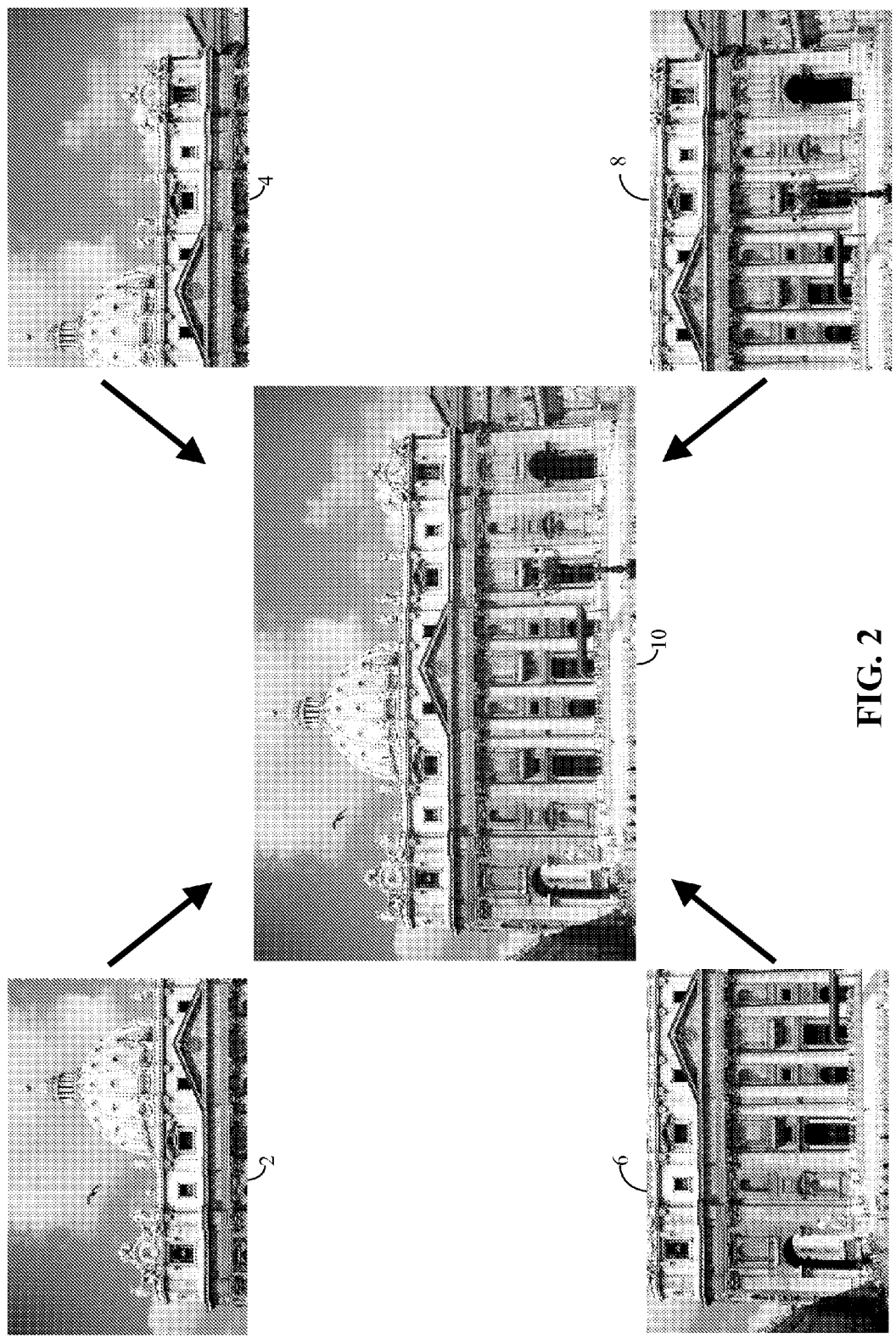
FIG. 2 illustrates the use of edge detection in feature detection and image stitching.
Figure 3:
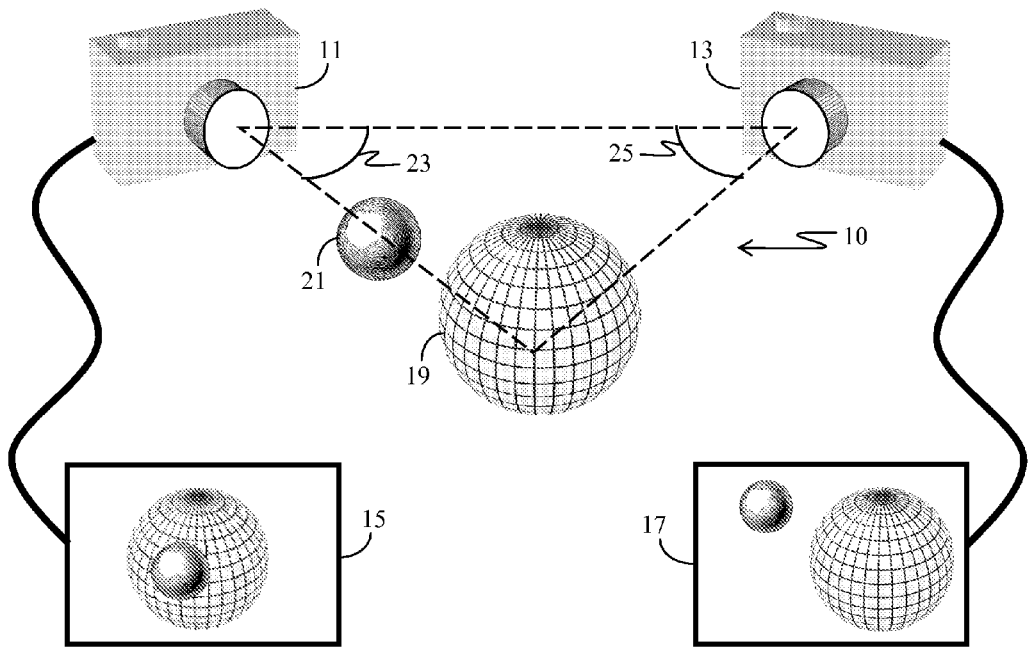
FIG. 3 illustrates a horizontal parallax as the basis for the epipolar stereo model.
Figure 4:
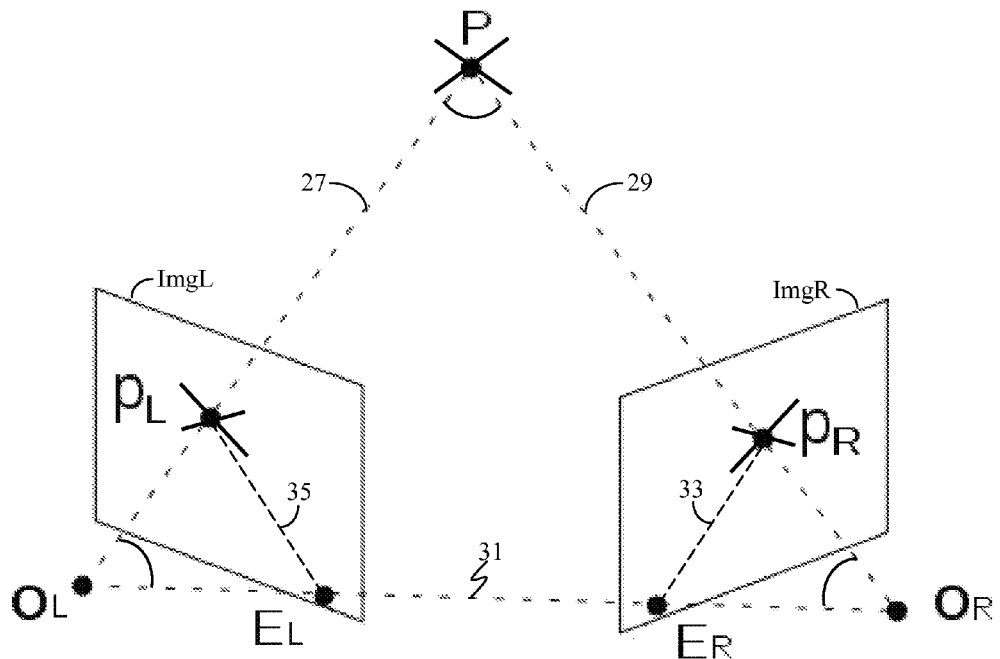
FIG. 4 is a simplified application of epipolar geometry to describe the stereo constraint.
Figure 10:
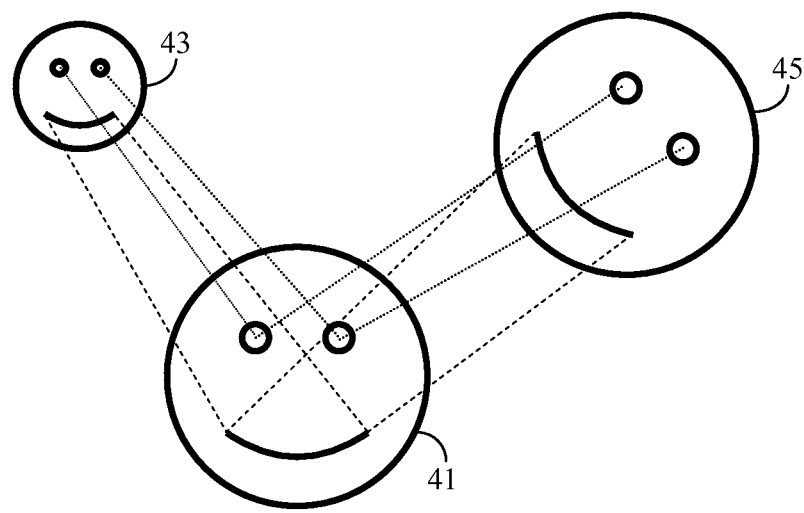
FIG. 10 illustrates the use of SIFT to match feature points of an object from one image to another.

Thus, SIFT permits one to match feature points of an identified object from one image to another. This is illustrated in FIG. 10, where three images of the same object, i.e. a happy face, are shown. For illustration purposes, only four feature points, corresponding to points on the eyes and the corners of the mouth, are shown. As indicated in FIG. 4, SIFT can match feature points from a first face 41 to a second face 43 irrespective of a change in scale. SIFT can also match feature points from first face 41 to a third face 45 irrespective of rotation. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, herein incorporated in its entirety by reference.

Figure 11:
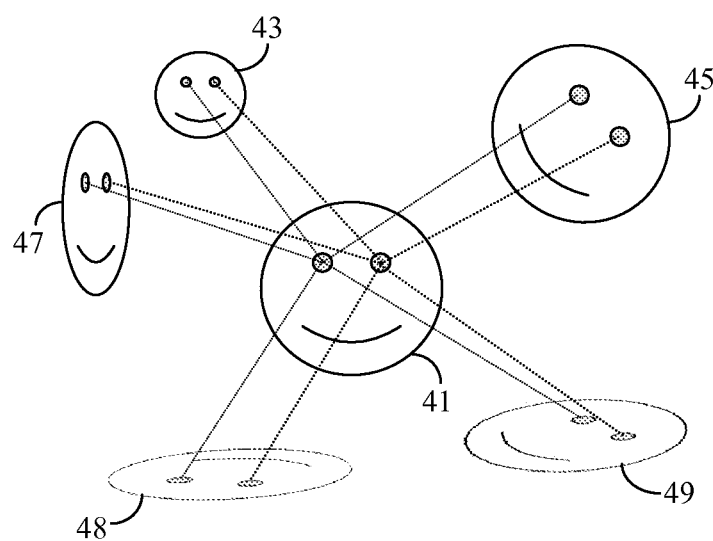
FIG. 11 illustrates the use of Affine SIFT to better match feature points among images with affine transformations.

With reference to FIG. 11, the object in an Affine SIFT would be better able to match feature points from first face 41, to representations of the same object that have undergone affine transformations, as illustrated by happy faces 47-49.

Figure 12:
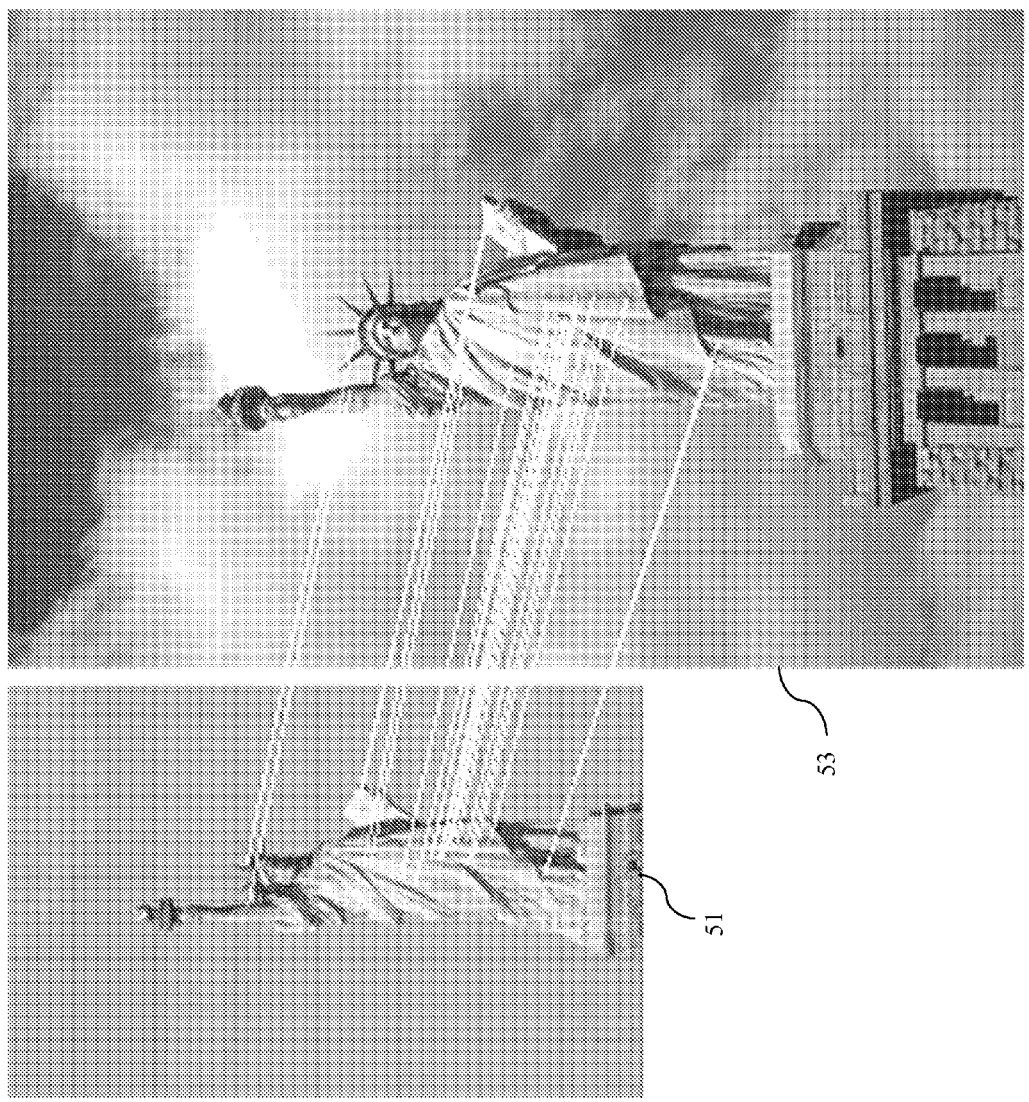
FIG. 12 illustrates the application of an Affine SIFT transform.

An example of an application of an Affine SIFT transform is illustrated in FIG. 12, where multiple feature points are matched from a first image 51 of the stature of liberty from a first view angle, to a second image 53 of the statue of liberty from a different view angle and at a different scale.

Thus, an objective in feature based correspondence matching algorithms is to find a list of feature points that correspond to each other in multiple images. Unfortunately, due to the image distortion caused by the use of curved mirrors in catadioptric cameras, feature based correspondence matching algorithms typically yield only a very sparse correspondence set. That is, feature based correspondence matching algorithm typically include a large percentage of erroneously matched and/or erroneously identified feature points. This large, and unknown, error set within the set of rendered matched feature points complicates the use of feature based correspondence matching algorithms in catadioptric cameras.

The present invention introduces new constraints to overcome some of the limitations of an affine transform as applied to non-pinhole cameras, as more specifically as applied to catadioptric cameras.

Preferably, the present algorithm is optimized for dense edge correspondence matching on multi-perspective images captured from non-central catadioptric cameras. The presently preferred embodiment builds on the Affine SIFT (ASIFT) feature based correspondence matching algorithm describe by Morel and Yu. More specifically, context constraints are used to augment correspondence sets obtained from the sparse ASIFT feature based on Morel and Yu's method. The present invention further introduces the use of an "epsilon stereo", explained below, as an extra geometric constraint to remove outlier corresponding sets.

Figure 13:
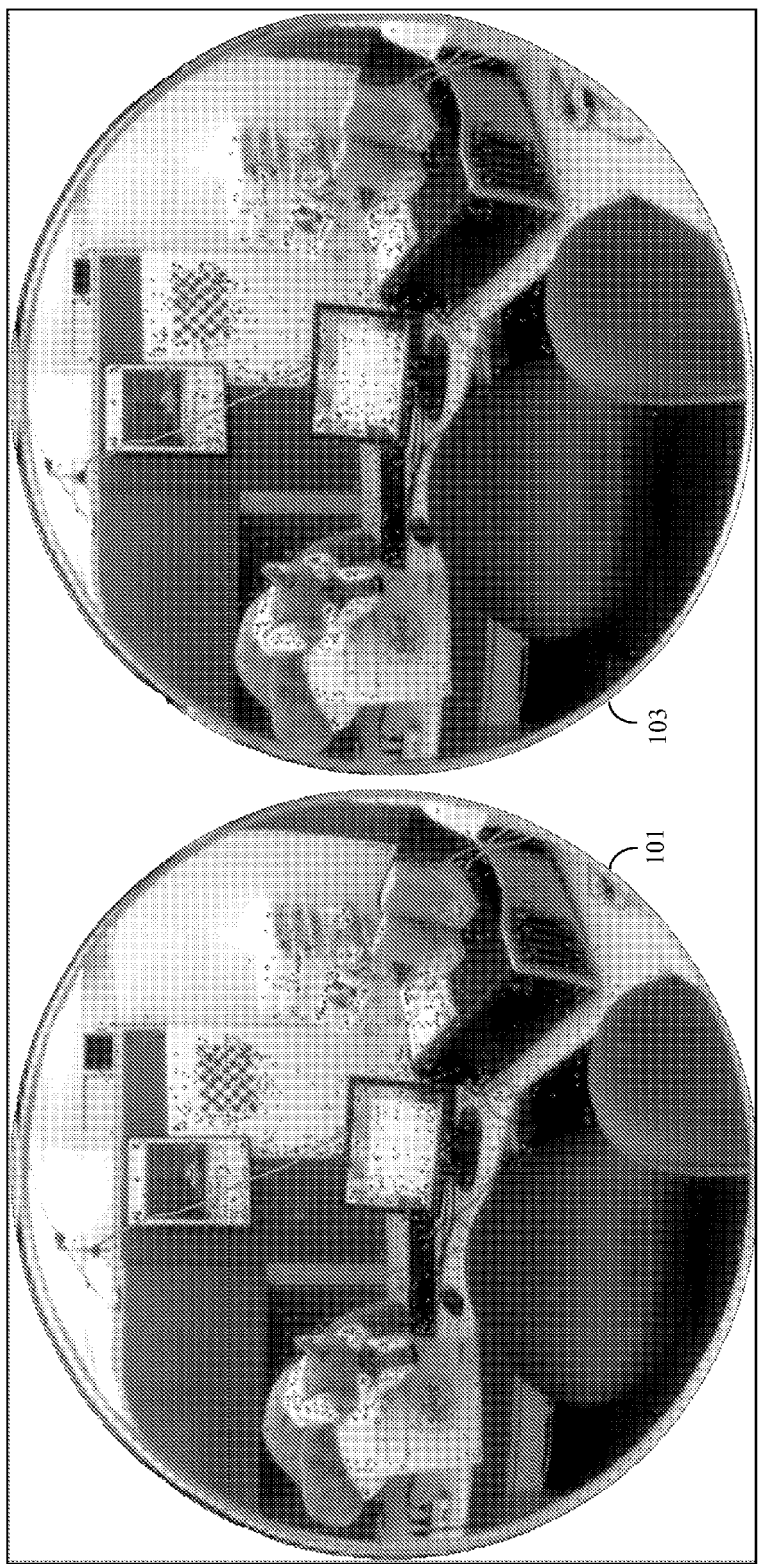
FIG. 13 shows the results of applying the Affine SIFT to images of the mirrors of FIG. 8.

The results of applying the Affine SIFT algorithm to mirrors 101 and 103 of FIG. 8 are shown in FIG. 13. All the identified corresponding sets (i.e. feature points in mirror 101 that are matched to features points in mirror 103) are shown as dark dots. As seen, there are a multitude of points scattered throughout the images of mirrors 101 and 103, and it is likely that many of the identified corresponding sets are erroneous, which limits the utility of this result. It is also noted that the scattered feature points do not follow the outline (i.e. edges) of any of the objects in mirrors 101 or 103. Thus, application of the present feature based correspondence matching algorithm is not suitable for edge detection. Edge detection, i.e. identifying the outline of specific objects, in the images would facilitate distinguishing between objects and facilitate manipulation of specific objects.

There is a plurality of edge detection algorithms known in the art, and selection of a specific edge detection algorithm for use in the present invention is not critical to the invention. It is noted, however, that in the present invention, the edge detection results are combined with the present epsilon stereo technique described below to provide an improved, and more useful, set of matched edge points. A discussion of the epsilon stereo technique now follows.

As is explained above, epipolar geometry and stereo constraints (i.e. epipolar constraints) do not generally apply to catadioptric cameras. This complicates the identifying of corresponding points in two images taken at different view angles since one cannot make use of the stereo constraint to identify such correspondences.

Figure 14:
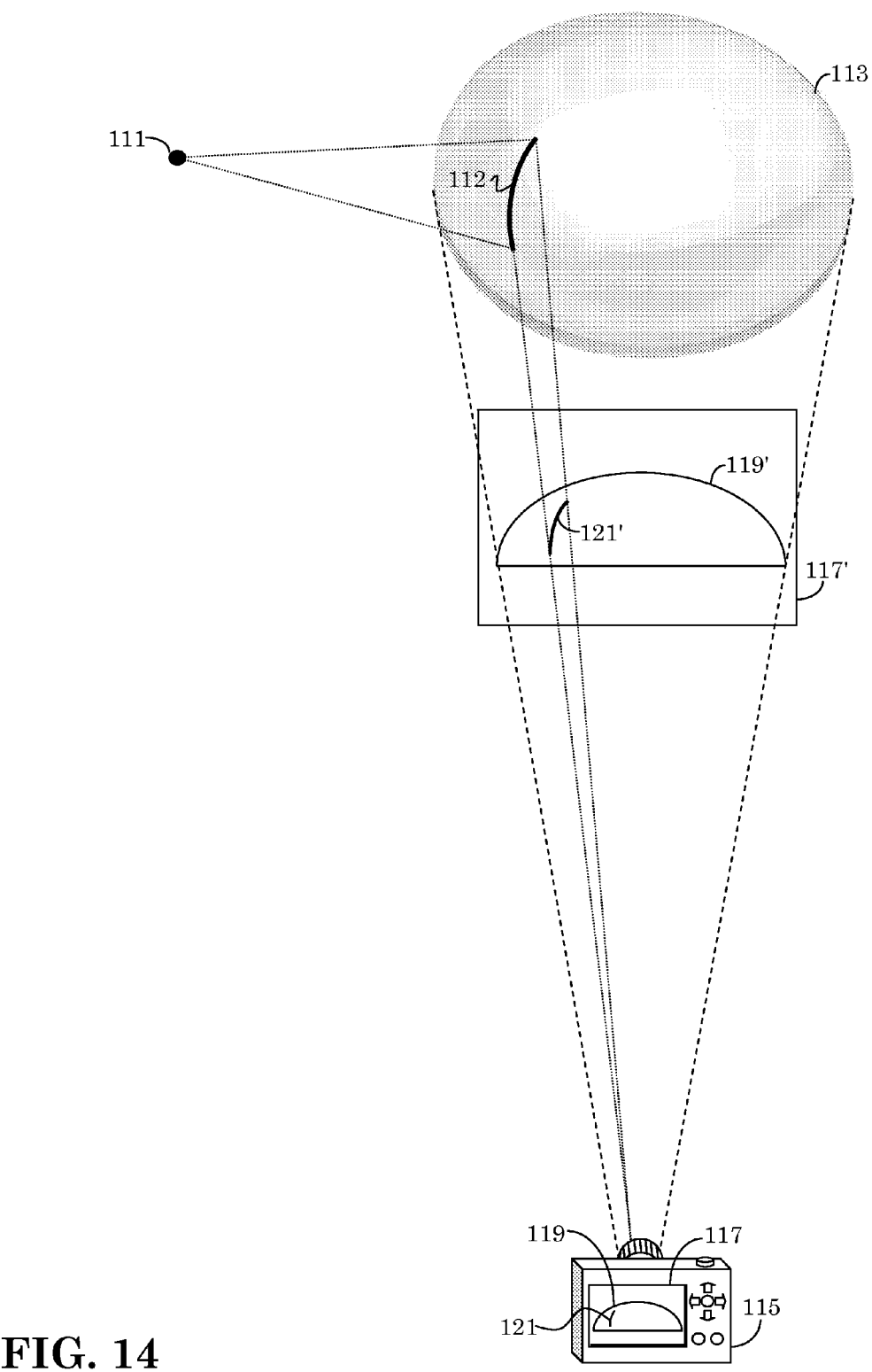
FIG. 14 illustrates a vertical distortion of a point in a catadioptric camera setup as the basis for an epsilon line.

With reference to FIG. 14, a real-world point 111 in a 3D scene will undergo an elongating distortion by a curved (i.e. dome) mirror 113 to form (i.e. reflect) a vertical curve line 112 relative to the viewing position of a camera 115. Camera 115 forms a 2D image 117 of a 2D representation 119 of 3D curved mirror 113. Curved line 112, which may follow the curvature of curved mirror 113, forms a distorted vertical curved line 121 in image 117. For ease of illustration, an enlarged image plane 117' of image 117 is shown. Within enlarged image plane 117', the 2D representation 119' of 3D curved mirror 113 and vertical curve line 121' are also shown.

It is to be understood that the elongating and the length of curved line 112 is exaggerated in FIG. 14 for ease of explanation. Also in the present example, point 111 is shown forming a relatively vertical reflection (i.e. curve line 112), but it is to be understood that, depending upon the orientation of mirror 113 relative to point 111 and to the view angle of camera 115, point 111 may form a horizontally distorted (or a combined horizontally and vertically distorted) reflection on mirror 113. This elongation distortion by a curved mirror of a point in a 3D scene is herein termed an epsilon line.

The epsilon line forms the basis of what is herein termed an epsilon stereo constraint. That is, if one can determine the size, position, and orientation of an epsilon line corresponding to a real point in a 3D scene, then one can determine if a 3D point within a 3D scene corresponds to a specific feature point in a first (distorted 2D) image taken at a first view angle by determining if the 3D point maps to the determined epsilon line (i.e. if it lines on or within a predefined distance from the determined epsilon line). Furthermore, if one can do the same for a second distorted 2D image taken from a second view angle, and the camera used to take both 2D images is calibrated to the curved mirror(s), then one can determine if both feature points on both 2D images correspond to each other.

Figure 15:
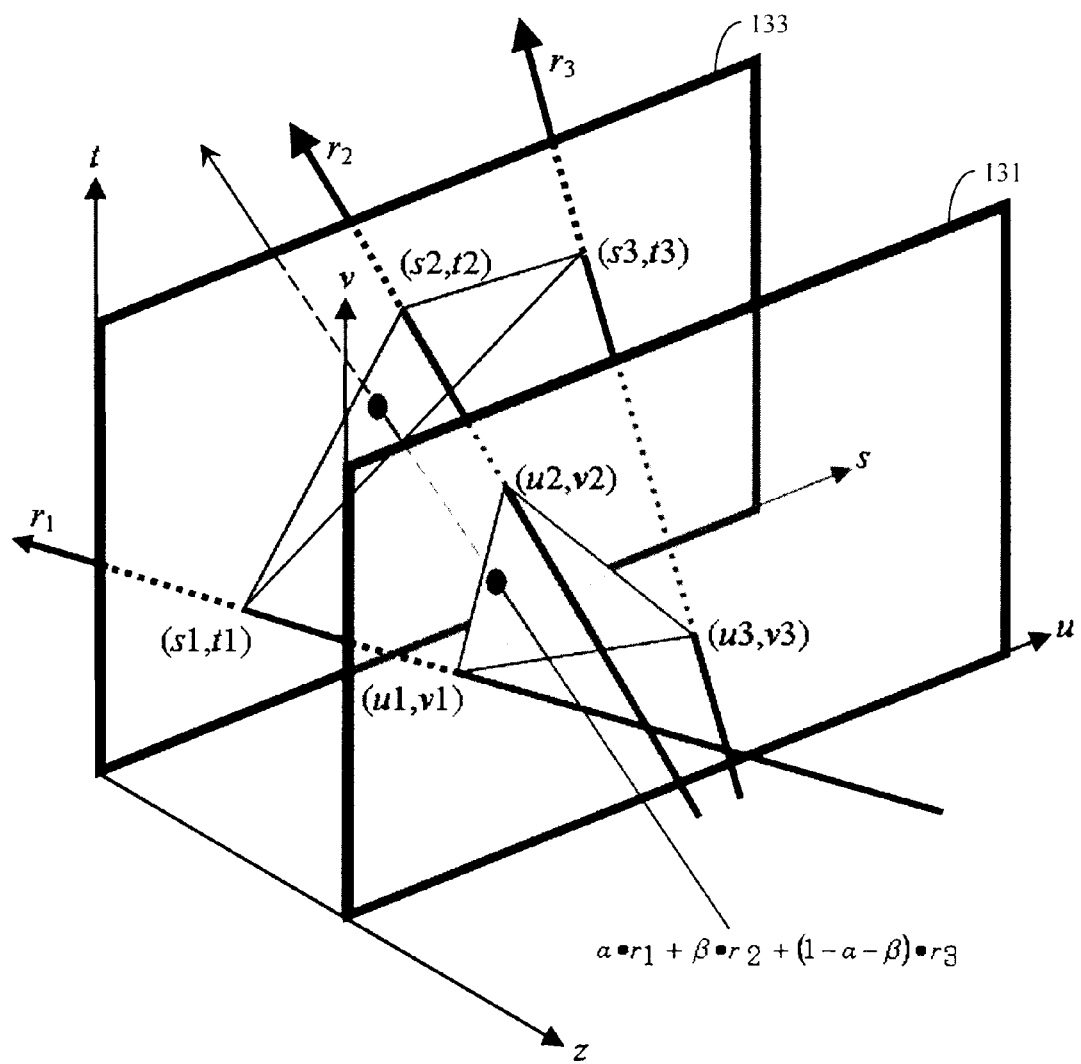
FIG. 15 provides a general description of the General Linear Camera (GLC) framework.

In order to provide a general explanation for determination of epsilon lines, and the subsequent epsilon constraint, it is beneficial to first provide a general camera model within which to derive the epsilon constraint. For ease of illustration, the present derivation is made within the framework known in the art as the General Linear Camera (GLC), which provides a general framework applicable to many types of cameras, including multi-perspective cameras such as catadioptric cameras. A general description of the GLC framework is illustrated in FIG. 15.

In the GLC framework, radiance along all possible affine combinations of three light rays (hereinafter rays) are collected. The rays are parameterized by their intersections of two parallel planes. If FIG. 15, rays $r_1$, $r_2$, and $r_3$ are parameterized by their intersections with parallel planes 131 and 133. Each of the two parallel planes are Cartesian planes described by their own abscissa and ordinate coordinates: plane 131 is described by Cartesian coordinates [u,v] and plane 133 is described by Cartesian coordinate [s,t]. This parameterization may be called a two-plane parameterization. Alternatively, each ray may be re-parameterized by substituting $\sigma=s-u$ and $\tau=t-v$. For the sake of simplicity, [$\sigma$, $\tau$, u, v] parameterization is used herein.

It is assumed plane 131 (hereinafter plane uv) is the default plane, and it is at position z=0 (i.e. z direction perpendicular to plane uv) and plane 133 (hereinafter plane st) is at z=1. Thus [$\sigma$, $\tau$, 1] represents the direction of a ray.

A GLC is defined as the affine combination of three rays:

$$\text{GLC} = \{r : r = \alpha \cdot [\sigma_1, \tau_1, u_1, v_1] + \beta \cdot [\sigma_2, \tau_2, u_2, v_2] + (1-\alpha+\beta) \cdot [\sigma_3, \tau_3, u_3, v_3], \forall \alpha, \beta\} \quad (1)$$

The GLC model is now simplified by choosing three specific rays that have [u,v] coordinates as [0,0], [1,0], and [0,1] to form a canonical GLC:

$$r[\sigma,\tau,u,v] = (1-\alpha-\beta) \cdot [\sigma_1, \tau_1, 0, 0] + \alpha \cdot [\sigma_2, \tau_2, 1, 0] + \beta \cdot [\sigma_3, \tau_3, 0, 1] \quad (2)$$

Figure 16:
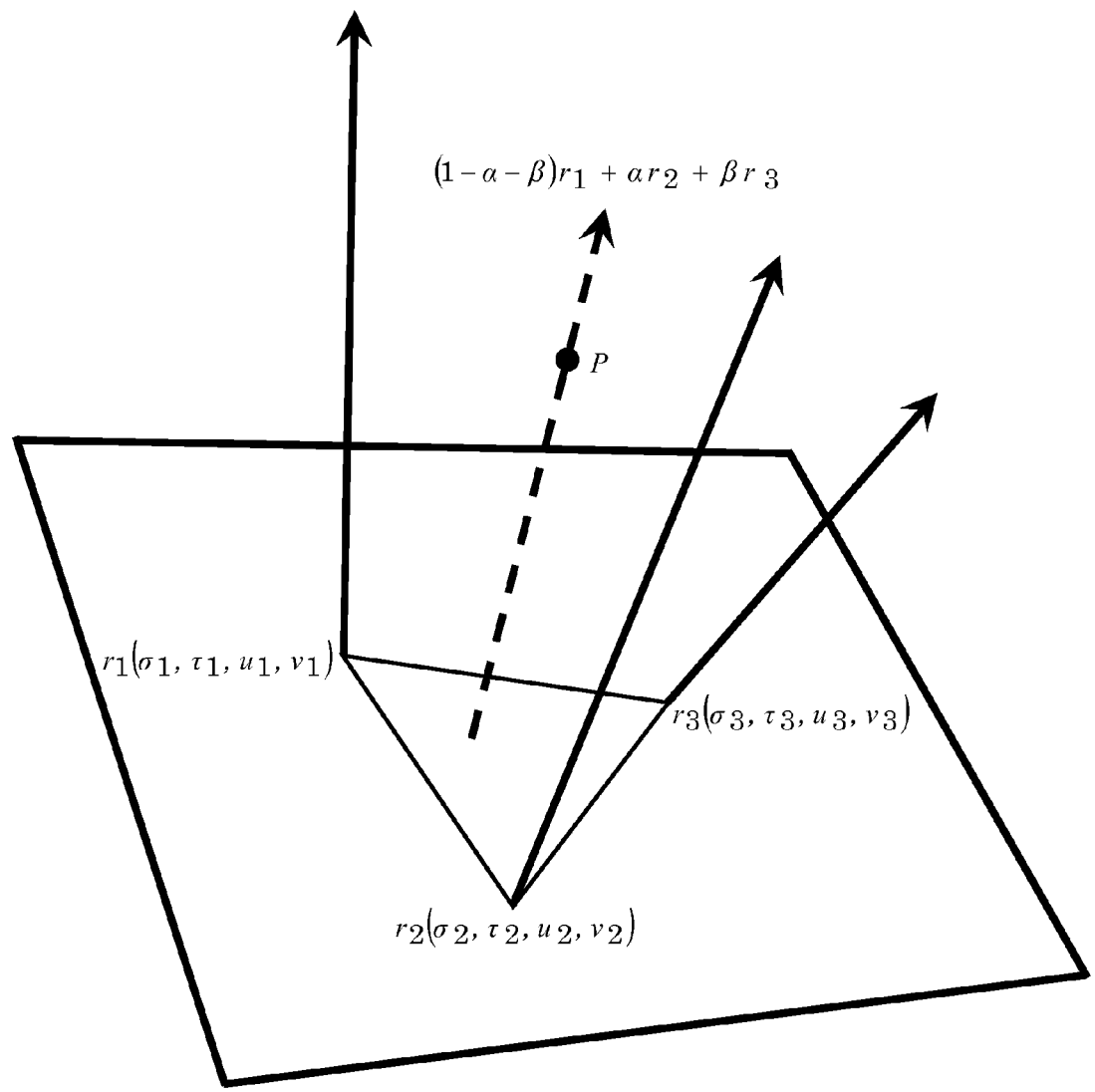
FIG. 16 illustrates the mapping of a 3D point P[x, y, z] to pixel [u,v] by GLC projection.

From the above, it is self-apparent that $\alpha=u$ and $\beta=v$. Therefore, every pixel [u,v] maps to a unique ray in the GLC. As is illustrated in FIG. 16, the GLC projection maps a 3D point P[x, y, z] to pixel [u,v].

$$u = \frac{\begin{vmatrix} z\sigma_1 & z\tau_1 & 1 \\ x & y & 1 \\ z\sigma_3 & 1-z\tau_3 & 1 \end{vmatrix}}{Az^2 + Bz + C}, \quad v = \frac{\begin{vmatrix} z\sigma_1 & z\tau_1 & 1 \\ 1+z\sigma_2 & z\tau_2 & 1 \\ x & y & 1 \end{vmatrix}}{Az^2 + Bz + C}$$

Basically, the GLC projection maps every 3D point P to a ray. The GLC model unifies many previous cameras, including the pinhole camera, the orthographic camera, the pushbroom camera, and the cross-slit camera.

The denominator corresponds to the characteristic equation of the GLC:

$$Az^2 + Bz + C = 0 \quad (4)$$

$$A = \begin{vmatrix} \sigma_1 & \tau_1 & 1 \\ \sigma_2 & \tau_2 & 1 \\ \sigma_3 & \tau_3 & 1 \end{vmatrix}, B = \begin{vmatrix} \sigma_1 & v_1 & 1 \\ \sigma_2 & v2 & 1 \\ \sigma_3 & v_3 & 1 \end{vmatrix} - \begin{vmatrix} \tau_1 & u_1 & 1 \\ \tau_2 & u2 & 1 \\ \tau_3 & u_3 & 1 \end{vmatrix}, \quad (5)$$

$$C = \begin{vmatrix} u_1 & v_1 & 1 \\ u2 & v2 & 1 \\ u_3 & v_3 & 1 \end{vmatrix}$$

The root $z_i$ (i=1, 2) in equation (4) corresponds to a slit (line) on plane $z=z_i$ that all rays in the GLC will simultaneously pass through. For instance, the cross-slit characteristic equation has two distinct roots since all rays simultaneously pass through two slits whereas an oblique camera has no solution.

Having described the GLC framework, the next step is to provide a more rigorous explanation of the epsilon constraint, or alternatively, epsilon stereo pairs.

As is explained above, in epipolar geometry a stereo pair consists of two images with a pure horizontal parallax, i.e., for every 3D point P, its images [u,v] and [u',v'] in the two cameras must satisfy v=v'. The present epsilon stereo model, i.e. epsilon stereo pairs, effectively fuses camera pairs that do not satisfy the stereo constraint of epipolar geometry.

Figure 17:
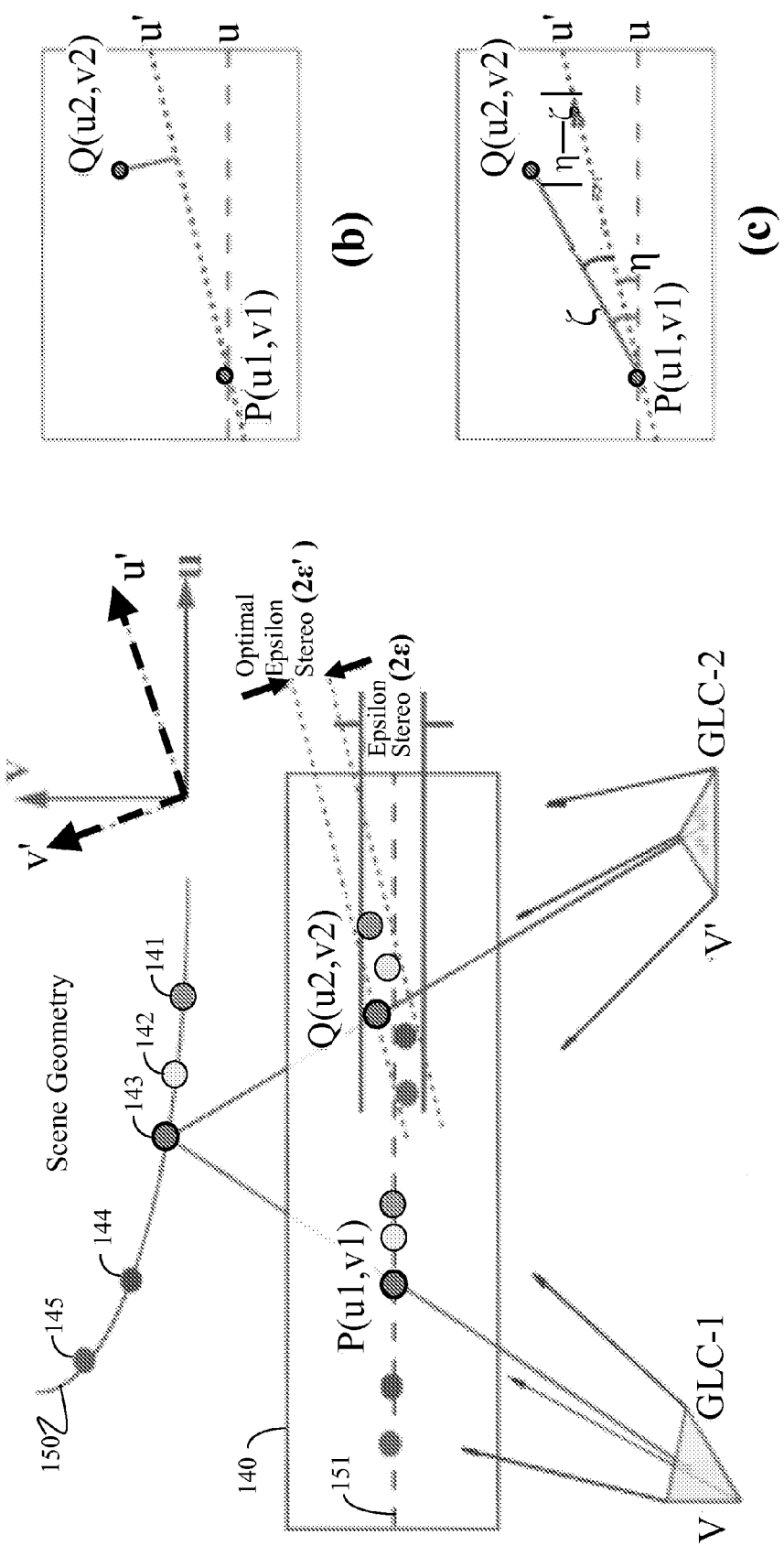
FIG. 17 illustrates the basis of the epsilon stereo model.

With reference to FIG. 17, five points 141-145 on a real-world object 150 undergo distortion when viewed from two distinct view points, V and V'. In the present example, real-world object 150 may be a curved reflective surface, such as curved mirror 113 of FIG. 14. Due to the distortion, points 141-145, which follow the curvature of object 150, appear to follow a straight, horizontal line 151 from the viewpoint of view V. But from view V', points 141-145 appear to follow a sequential wavy pattern along an upward path diagonal to horizontal line 151.

Each of points 141-145 is distorted, and each defines a distortion offset or vertical parallax (such as suggested by vertical curve line 112 in FIG. 14, described above). This vertical parallax is herein termed an epsilon, e, vertical parallax. From the viewpoint of view V', point 143 may be seen anywhere within a distortion offset of 2ε. Thus, if point Q is determined to reside within the distortion offset of point 143, then point Q may correspond to point 143. But if point Q were to reside outside the distortion offset defined by point 143, then it may be concluded that point Q does not correspond to point 143.

Thus, two views V and V' form an epsilon stereo pair (i.e. a feature point in view V corresponds to a feature point in view V') if the following property holds:

rays V(u,v) and V'(u',v') intersect only if |v−v'|≤ε.

Basically, an epsilon stereo pair consists of two images, which may have a mostly horizontal parallax, having a slight ε vertical parallax. The ε vertical parallax may be measured using a distance metric, as illustrated in image (b), or an angular metric, as illustrate in image (c). If desired, the horizontal direction $\vec{d}$ may be changed (i.e. the reference axis may be shifted and/or rotated) to reduce ε.

Any two such views may be referred to as an e-pair. Preferably, it may be assumed that all views are u-continuous and v-continuous. Scene analysis may be simplified by considering only scene geometry visible from both views. A more detailed discussion of epsilon stereo pairs may be found in "Epsilon Stereo Pairs", British Machine Vision Conference (BMVC), 2007, by Yuanyuan Ding (an inventor of the present invention), et al., herein incorporated in its entirety by reference.

Figure 18:
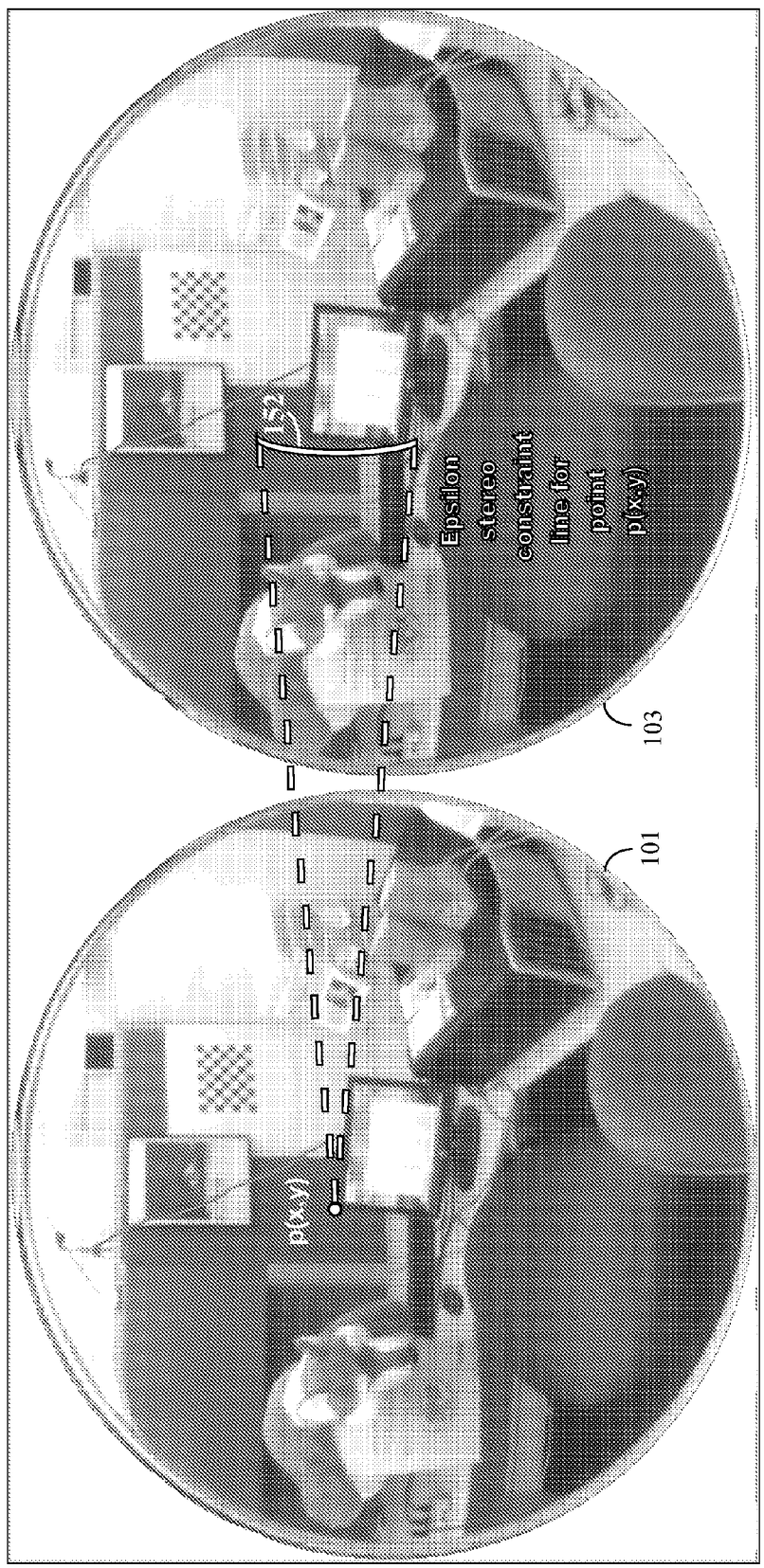
FIG. 18 illustrates the determination of an epsilon stereo constraint in a mirror image relative to a given point.

Returning to the present invention, FIG. 18 illustrates the determination of an epsilon stereo constraint 152 in mirror 103 for a given point p(x,y) (i.e. a given pixel) in mirror 101. As is explained above, epsilon stereo constraint 152 is generally a curved line segment, and represents a vertical parallax. That is, a point in mirror 103 corresponding to point p(x,y) should lie somewhere along the path defined by epsilon stereo constraint 152, and lie no more than a predefined maximum distance (preferably 5 pixels) from epsilon stereo constraint 152.

As is explained more fully below, point p(x,y) is preferably an edge detected pixel, such as the corner edge of a computer monitor display, as illustrated in mirror 101. Alternatively, p(x,y) may be any of the many feature points of mirror 101 shown in FIG. 13. If point p(x,y) is an edge detected pixel, then epsilon stereo constraint 152 can be used to identify a corresponding edge pixel in mirror 103. If point p(x,y) is a feature point detected by a feature based correspondence matching algorithms (i.e. part of an ASIFT feature point pair), then epsilon stereo constraint 152 can be used to confirm the validity of the corresponding feature point within mirror 103 that is paired to point p(x,y).

In other words, an edge detection tool may be used to identify a plurality of edge pixels, but the edge detection tool does not identify matching edge pixels between images of the same object pictured from two view angles. After identifying edge pixels, one another tool is still required for matching (i.e. indexing) edge detected pixels in a first image (i.e. mirror 101) to their corresponding edge pixels in a second image (i.e. mirror 103). Since an object of the present invention is to identify matching edge pixels between images, the presently preferred embodiment assumes that point p(x,y) in mirror 101 is an edge detected pixel, and epsilon stereo constraint 152 is used to identify (i.e. index) a corresponding edge pixel in mirror 103. It is to be understood that a similar process may be used to verify the validity of matching feature point pairs produced by an ASIFT transform.

Figure 19:
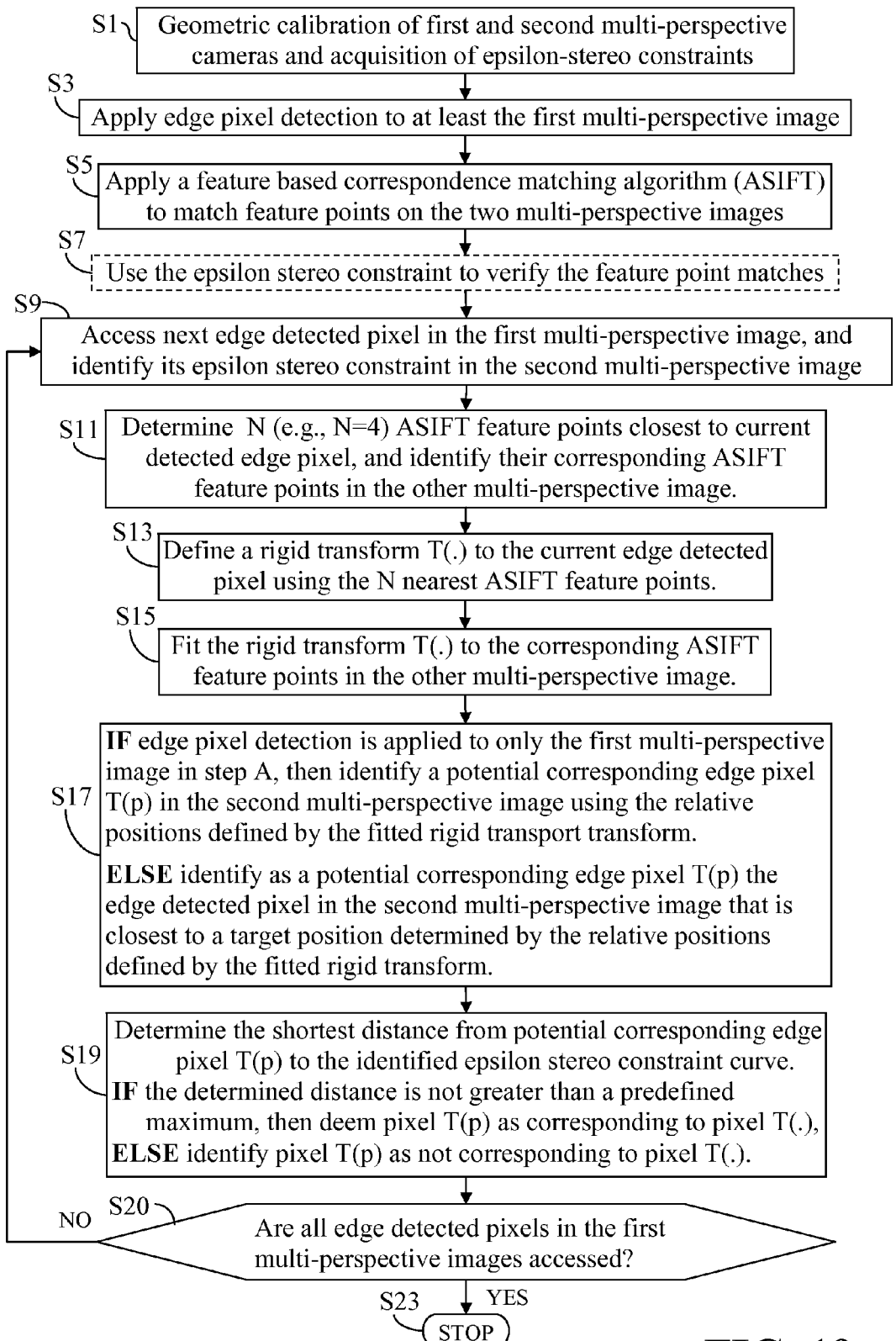
FIG. 19 provides a first exemplary flowchart of an application of the present invention.

FIG. 19 provides a first exemplary flowchart of an application of the present invention, and FIGS. 20A to 20H illustrate various process steps of FIG. 19.

Figure 20A:
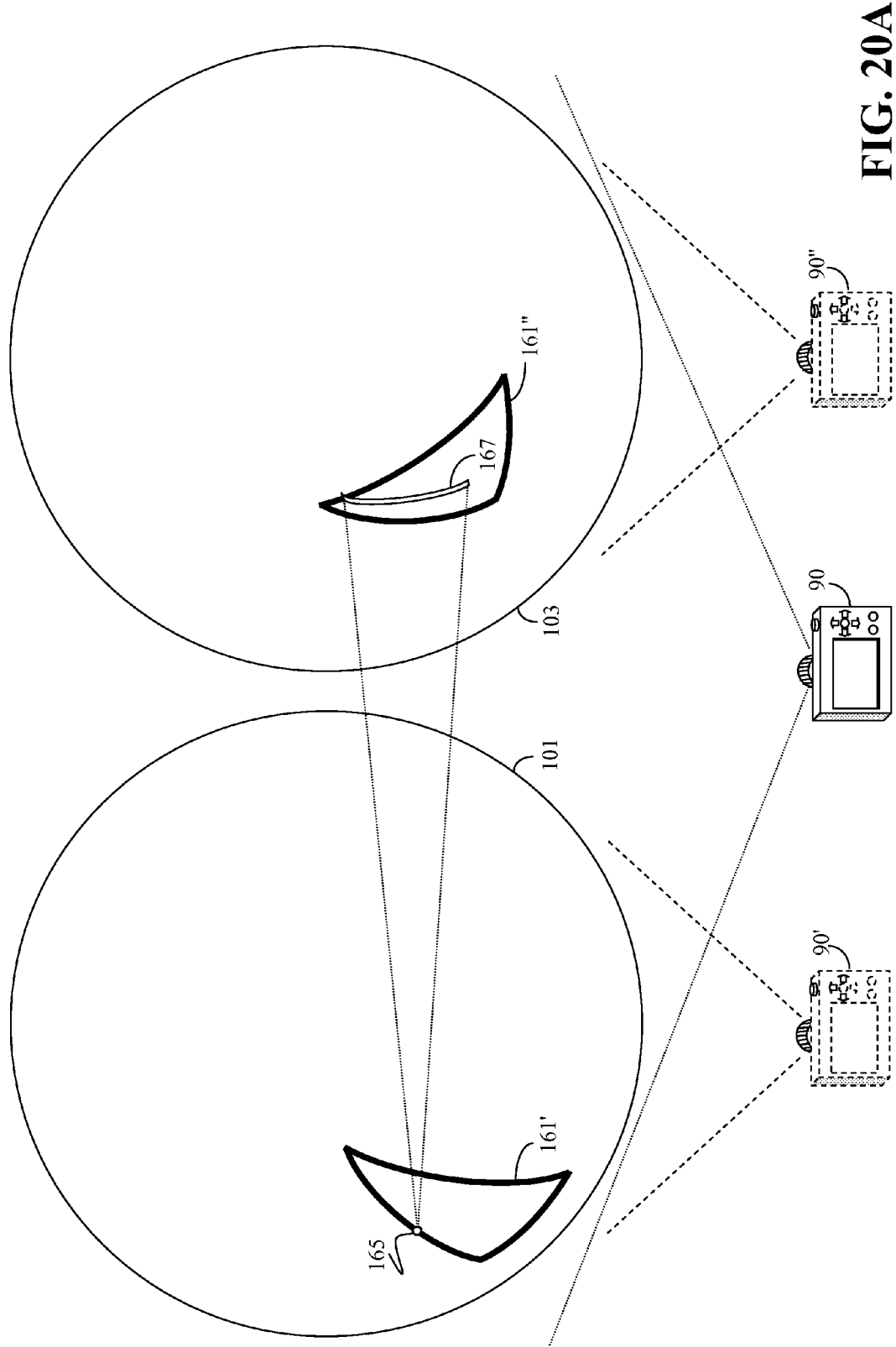
FIGS. 20A to 20H illustrates various process steps of the flowchart of FIG. 19.

With reference to FIG. 20A, the present example is applied to the two mirrors, or multi-perspective images, 101 and 103 of FIG. 8, but for ease of explanation the images on mirrors 101 and 103 are replaced with simplified images. In FIG. 20A, mirror 101 shows a first distorted (i.e. curved) view 161' of a triangle and mirror 103 shows a second distorted view 161" of the same triangle. Each of mirrors 101 and 103 defines a multi-perspective camera, irrespective of whether mirrors 101 and 103 share the same camera, or not. For example, a first multi-perspective camera defined by mirror 101 may include mirror 101 and its own, individually corresponding camera 90', and a second multi-perspective camera defined by mirror 103 may include mirror 103 and its own, individually corresponding camera 90". Alternatively, the first and second multi-perspective cameras defined by mirrors 101 and 103 may share a single camera 90, and camera 90 may optionally image both mirrors 101 and 103 simultaneously or individually.

A first step S1 is to geometrically calibrate the two multi-perspective cameras defined by mirrors 101 and 103, by any appropriate calibration means known in the art. Once calibrated, the epsilon-stereo constraint is acquired, as defined above.

A subsequent step, S3, is to apply edge pixel detection to at least one of the two multi-perspective images. In one embodiment of the present invention, edge pixel detection is applied only to the first multi-perspective image of mirror 101. In another embodiment of the present invention, edge pixel detection is applied to both the first and second multi-perspective images of mirrors 101 and 103. For illustration purposes, FIG. 20A shows an edge detected pixel 165 of triangle 161' on mirror 101 and its corresponding epsilon stereo constraint curve 167 on the image of mirror 103.

Figure 20B:
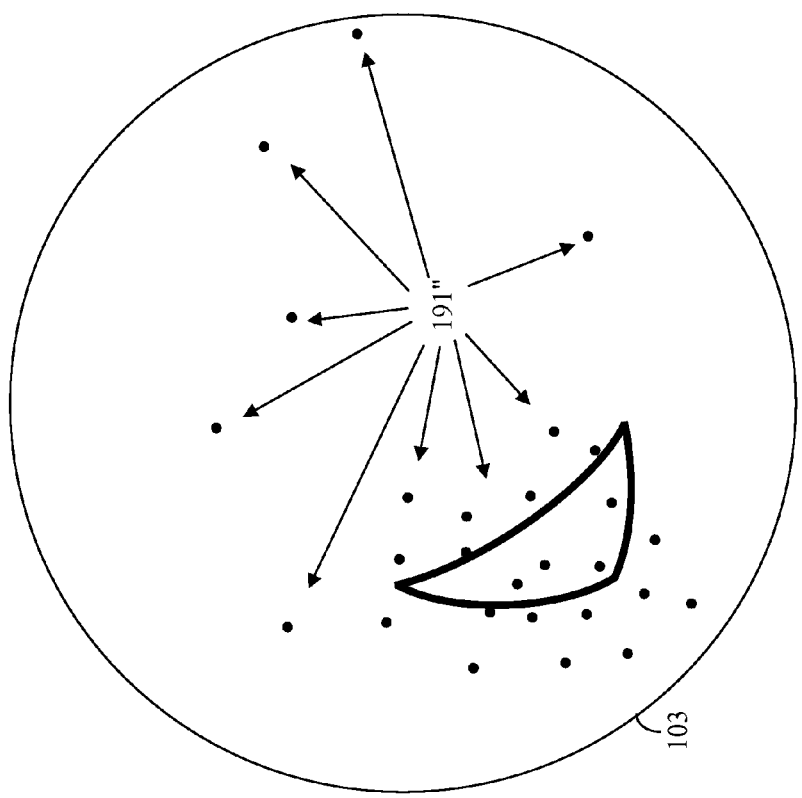
Figure 20B:
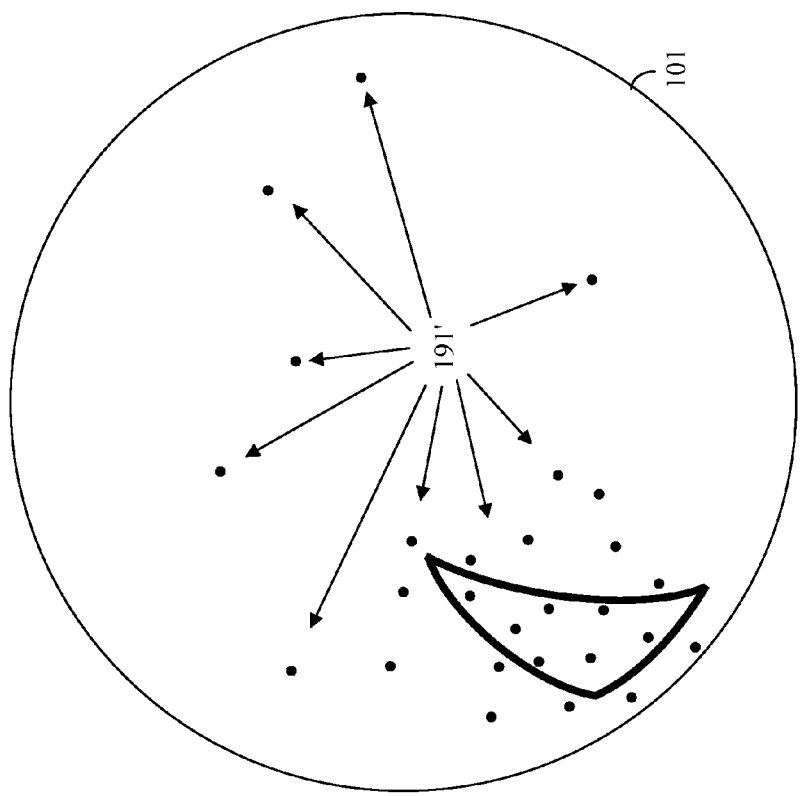

In step S5, a feature based correspondence matching algorithm, such as the ASIFT transform disclosed by Morel et al., is applied to the multi-perspective images of mirrors 101 and 103. As is illustrated in FIG. 20B, this results in a first cloud of identified feature points 191' in the image of mirror 101 and a corresponding second cloud of corresponding feature points 191" in the image of mirror 103.

It may be noted that the order of steps S1, S3 and S5 is not critical to the present invention.

Step S7 is optional, as indicated by being enclosed in a dashed-line box. Step S7 optionally verifies the output from the ASIFT transform by using the epsilon stereo constraint to validate feature point pair correspondence between the images of mirrors 101 and 103. That is, for each feature point in the image of mirror 101, its epsilon stereo constraint curve is determined, and then the position of its corresponding feature point in the image of mirror 103 relative to the position of the determined epsilon stereo constraint curve is checked. If the corresponding feature point is on (or within a predefined maximum distance of preferably 5 pixels from) the determined epsilon stereo constraint curve, then the corresponding feature point pair deemed valid and retained. Otherwise, it is deemed invalid and the feature point pair (in the images of both mirror 101 and 103) are removed from the ASIFT output. That is, if an index of matched pairs, as verified by the epsilon stereo constraint, is maintained, then this index of matched pairs would override (or replace) the correspondence index matches produced by the ASIFT.

The following steps uses the epsilon stereo constraint to map edge detected points (i.e. pixels) in the first multi-perspective image to their corresponding edge points in the second multi-perspective image.

Figure 20C:
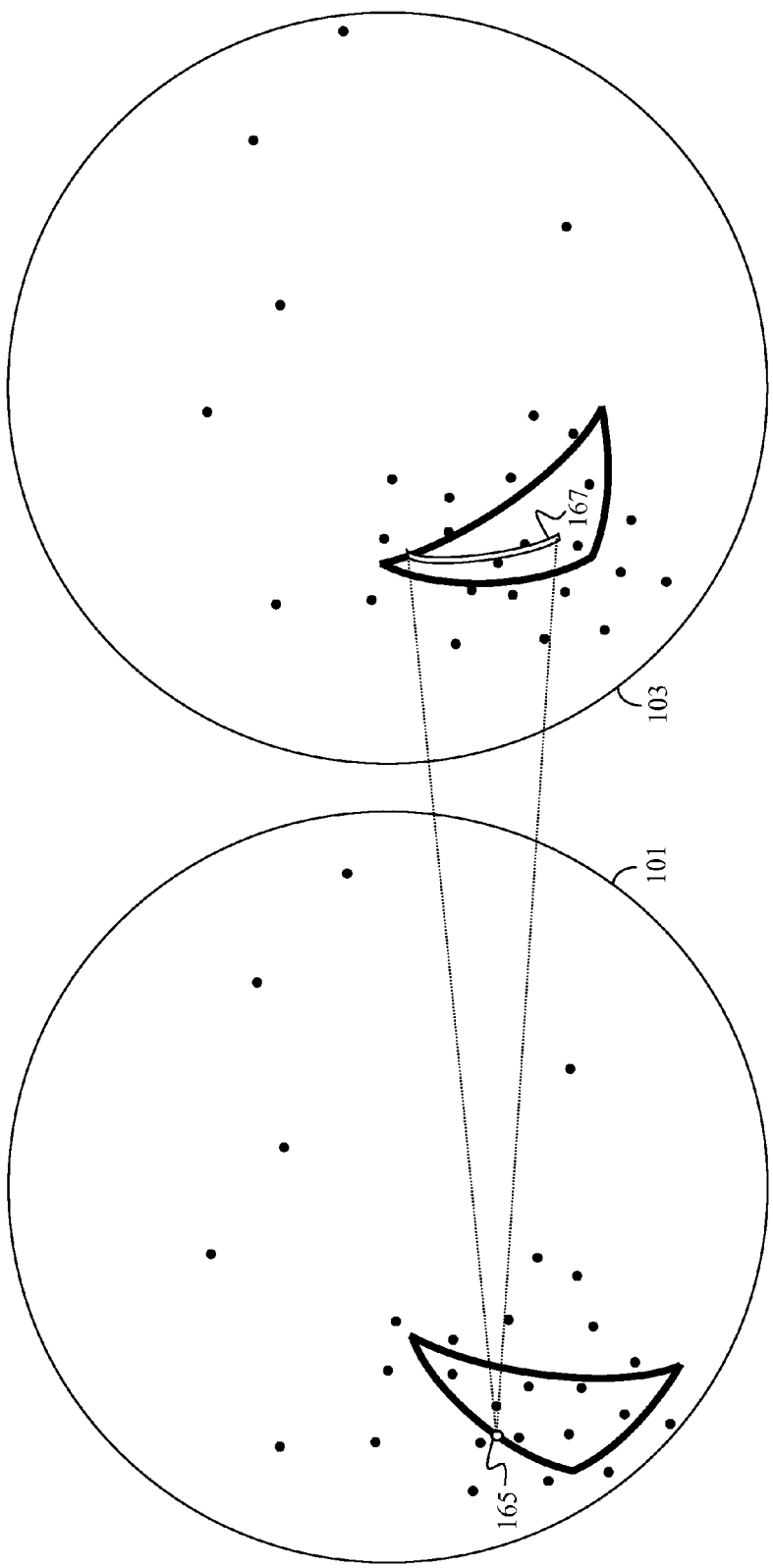

Step S9 accesses a next edge detected pixel from the image of mirror 101 (i.e. the first multi-perspective image) and identifies its epsilon stereo constraint (or equivalently, its epsilon stereo constraint curve). This is illustrated in FIG. 20C, where edge detected pixel 165 is highlighted, and its corresponding epsilon stereo constraint curve 167 is shown.

Figure 20D:
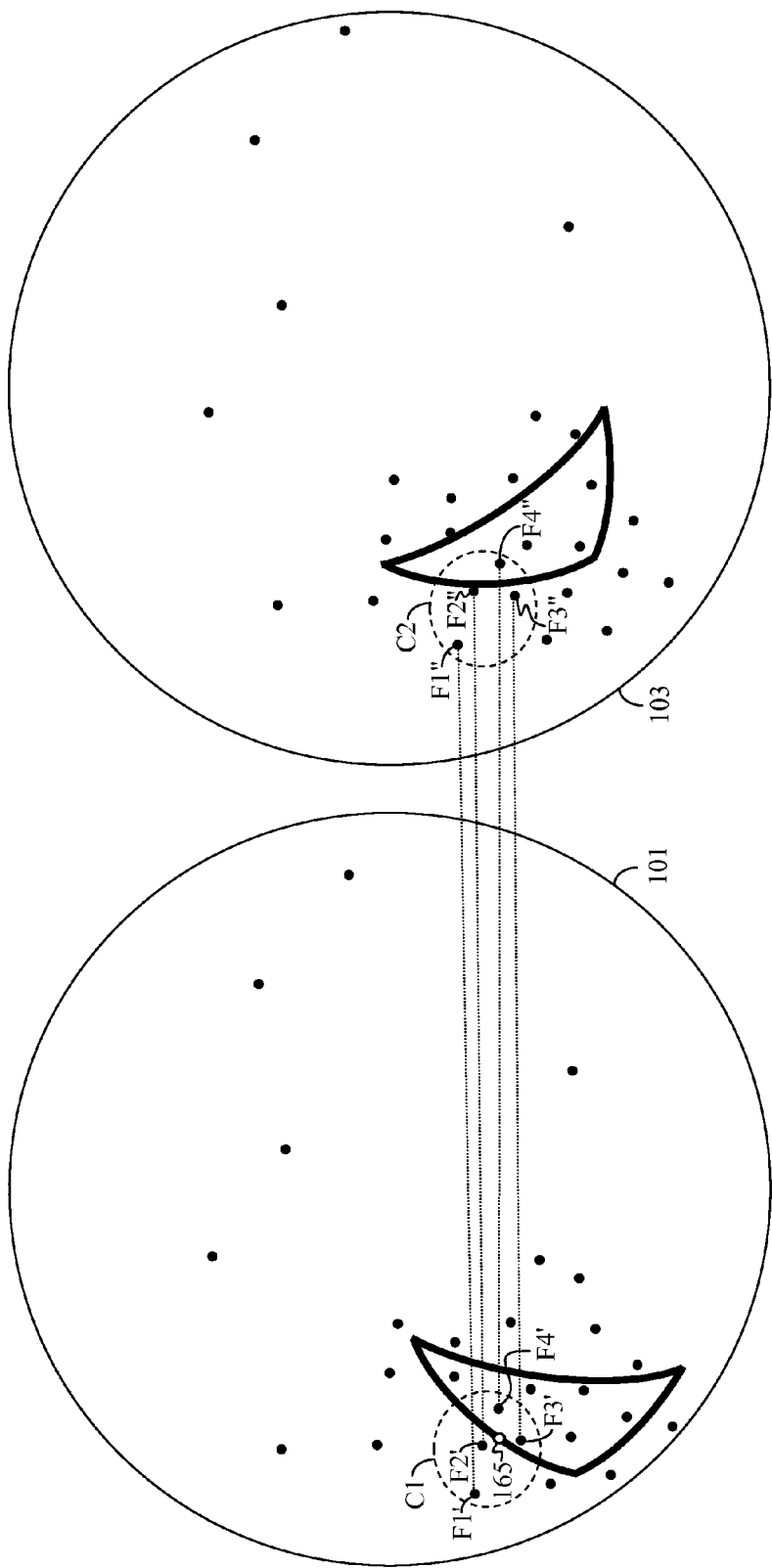

In step S11, as shown in FIG. 20D, a predetermined number, N, of ASIFT feature points closest to the currently accessed edge detected pixel 165 are determined. In the present example, N is 4 for illustration purposes, but N is preferably 25 in more practical applications. The cluster of N identified closest ASIFT feature points F1' to F4' are enclosed within dashed circle C1 for ease of identification. The feature points F1" to F4" in the image of mirror 103 (i.e. the second multi-perspective image) correspond to feature points F1'-F4'. Feature points F1" to F4" are likewise shown enclosed within dashed circle C2 for ease of identification. Feature point F1' in the first multi-perspective image corresponds to feature point F1" in the second multi-perspective image, and together they form a first feature point pair, as indicated by a dotted line. Similarly, feature points F2' and F2" form a second feature point pair; feature points F3' and F3" form a third feature point pair; and feature points F4' and F4" form a fourth feature point pair.

Figure 20E:
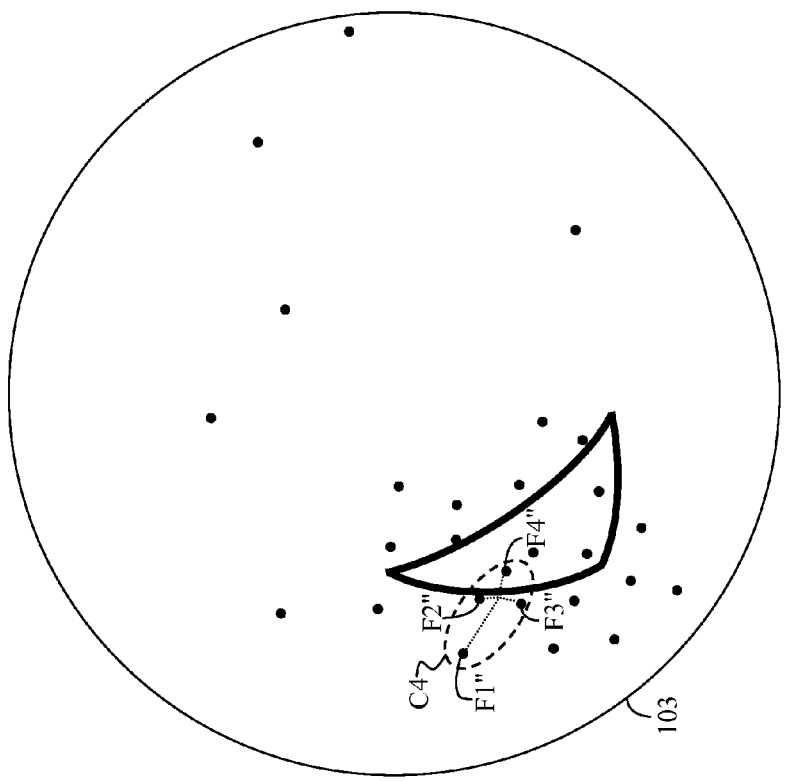
Figure 20E:
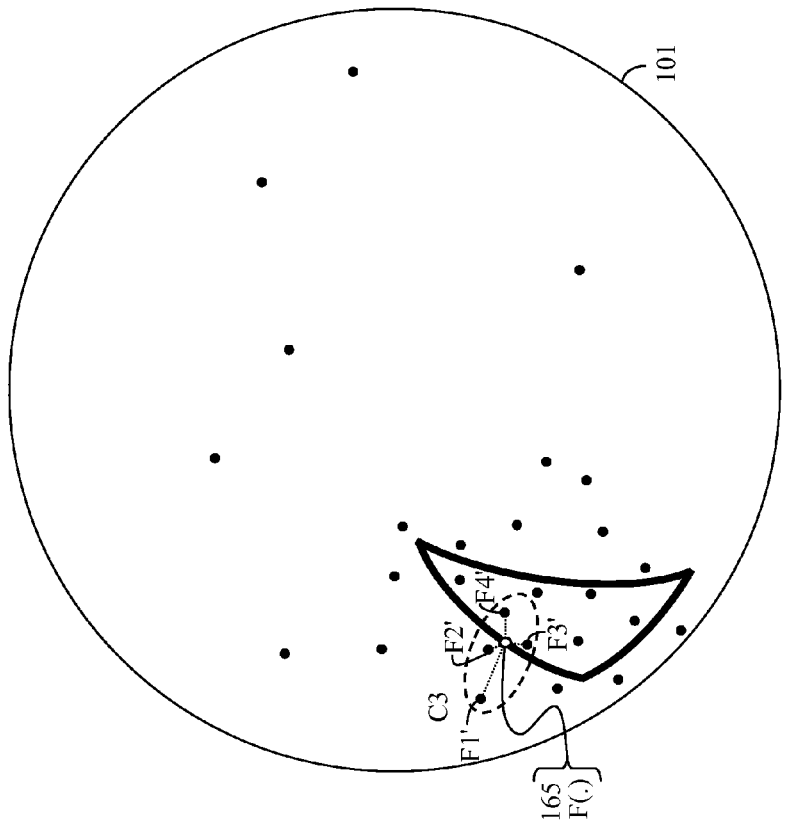
Figure 20F:
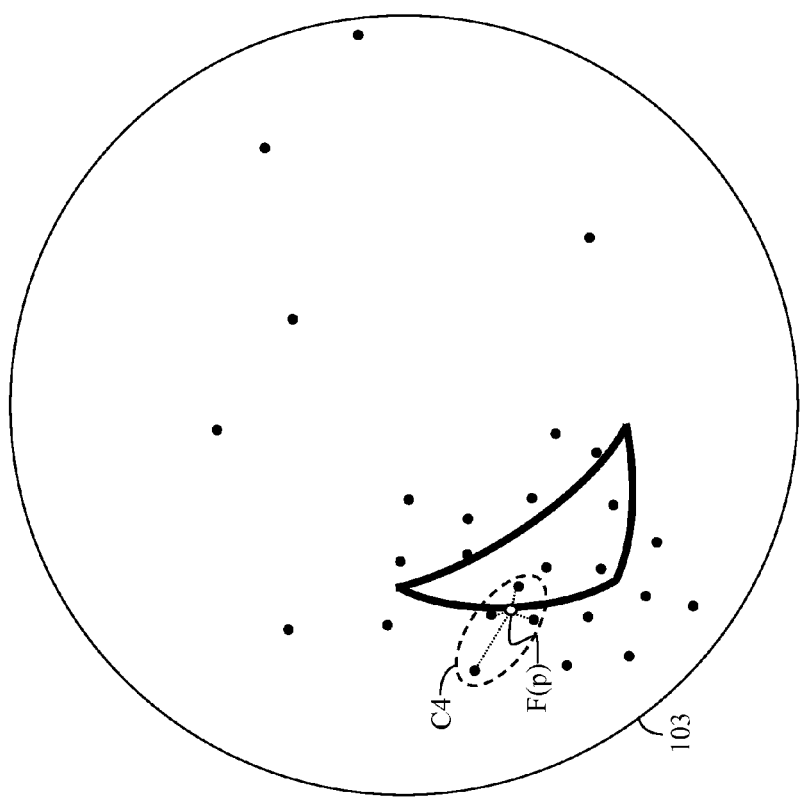
Figure 20F:
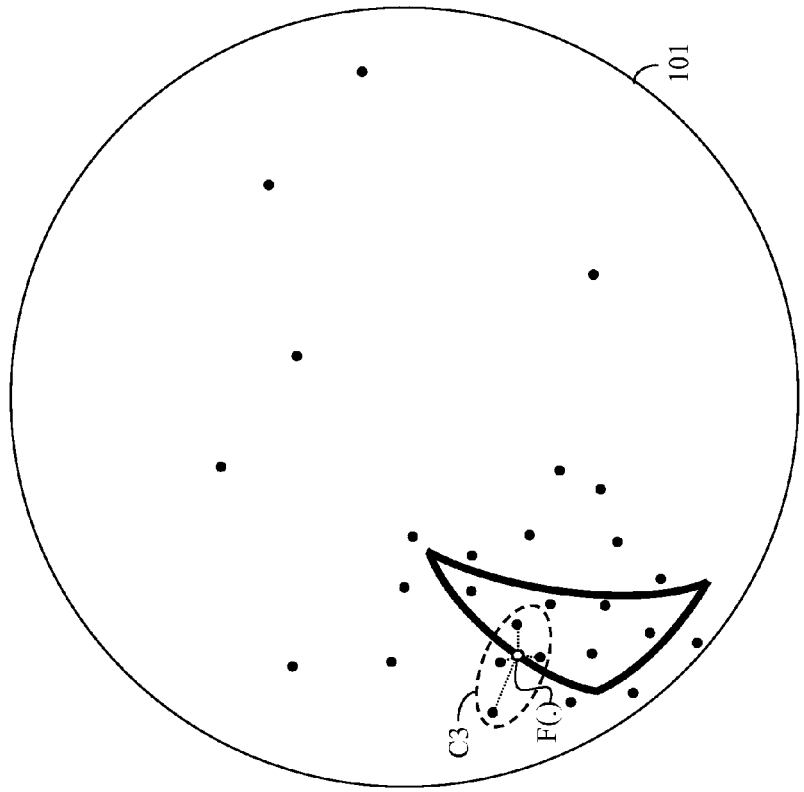

Next in step S13, a rigid transform is defined for the current edge detected pixel 165, i.e. T(.), using the N nearest ASIFT feature points, F1' to F4', as illustrated in FIG. 20E. Rigid transforms are well known in the art, and generally define fixed displacement relationships relative to defined point(s). Rigid transform is identified by dotted lines, and an oval C3 for ease of identification.

Next, the rigid transform is fitted to the corresponding ASIFT feature points F1"-F4" (step S15). The fitted rigid transform is identified by oval C4, and is rotated slightly to achieve a best fit.

The aim of step S17 is to identify the edge point in the image of mirror 103 that best corresponds to edge detected pixel 165, as determined by the fitted rigid transform. As is explained above, edge pixel detection may optionally be applied, or not applied, to the image of mirror 103. If edge pixel detection was applied to only the image of mirror 101 (i.e. the first multi-perspective image) in step S5, then the fitted rigid transform is used to identify a potential corresponding edge pixel T(p) in the image of mirror 103 (i.e. the second multi-perspective image) as determined from the relative positions feature points F1" to F4". However, if edge pixel detection was applied to the image of mirror 103, then one may identify as a potential corresponding edge pixel T(p) the edge detected pixel in the image of mirror 103 that is closest to a target position determined by the relative positions defined by the fitted rigid transform. The potential corresponding edge pixel T(p) is highlighted in FIG. 20F.

Figure 20G:
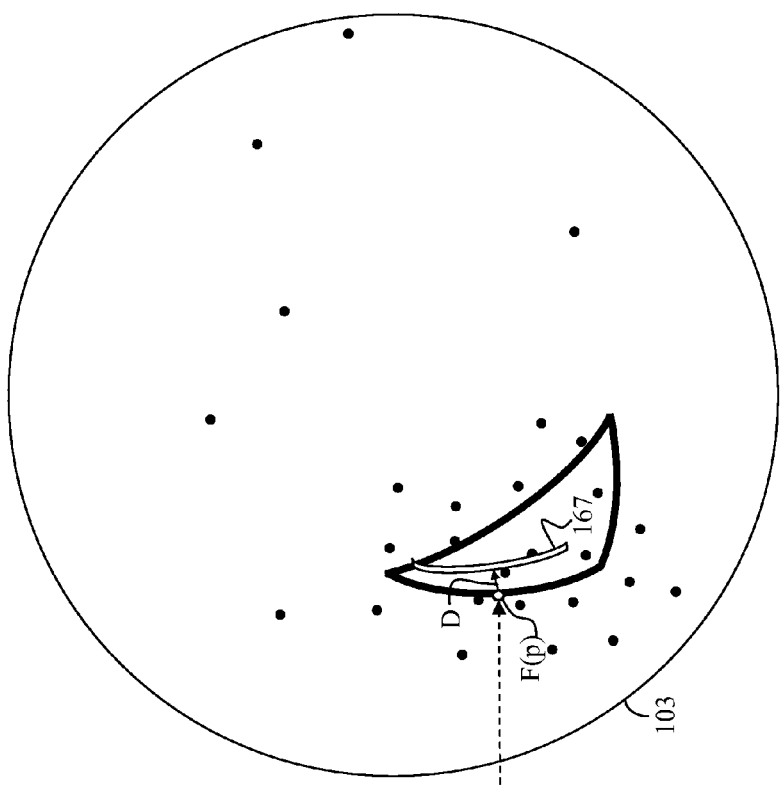
Figure 20G:
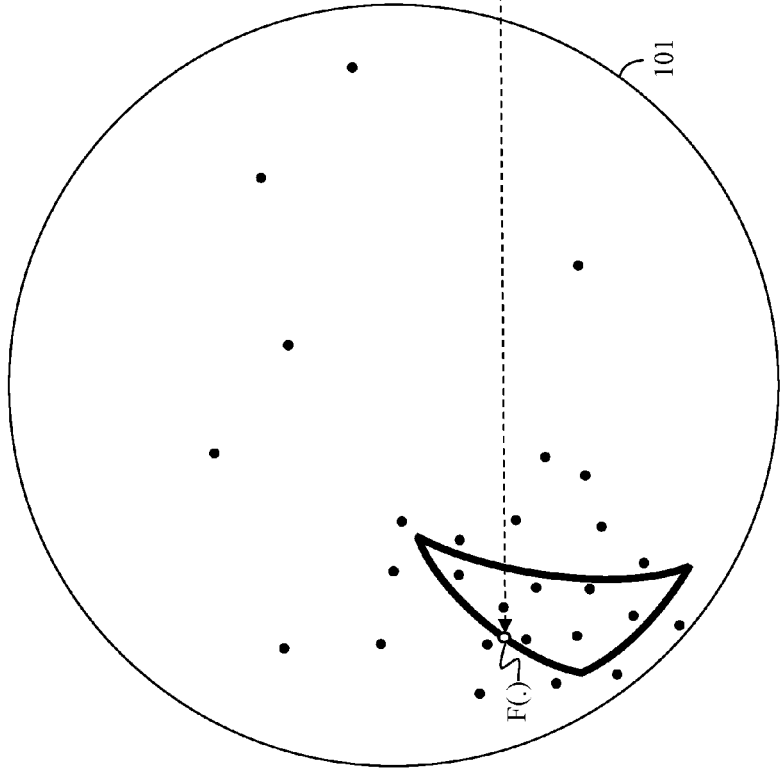

As illustrated in FIG. 20G, the next step S19 is to determine if the potential corresponding edge pixel T(p) identified in step S17 is substantially within the epsilon stereo constraint of edge detected pixel 165, i.e. F(.). To achieve this, the shortest distance D from potential corresponding edge pixel T(p) to the identified epsilon stereo constraint curve 167 is determined. IF the determined distance D is not greater than a predefined maximum Dmax (preferably 5 pixels), then potential corresponding edge pixel T(p) is retained and deemed to truly correspond to edge detected pixel T(.), i.e. pixel T(p) is matched (or indexed) to pixel T(.). If desired, an index of match pixel pairs may be maintained, in which case, and the pixel pair comprised of edge detected pixel T(.) and potential corresponding edge pixel T(p) would be added to the index of matched pixel pairs.

Figure 20H:
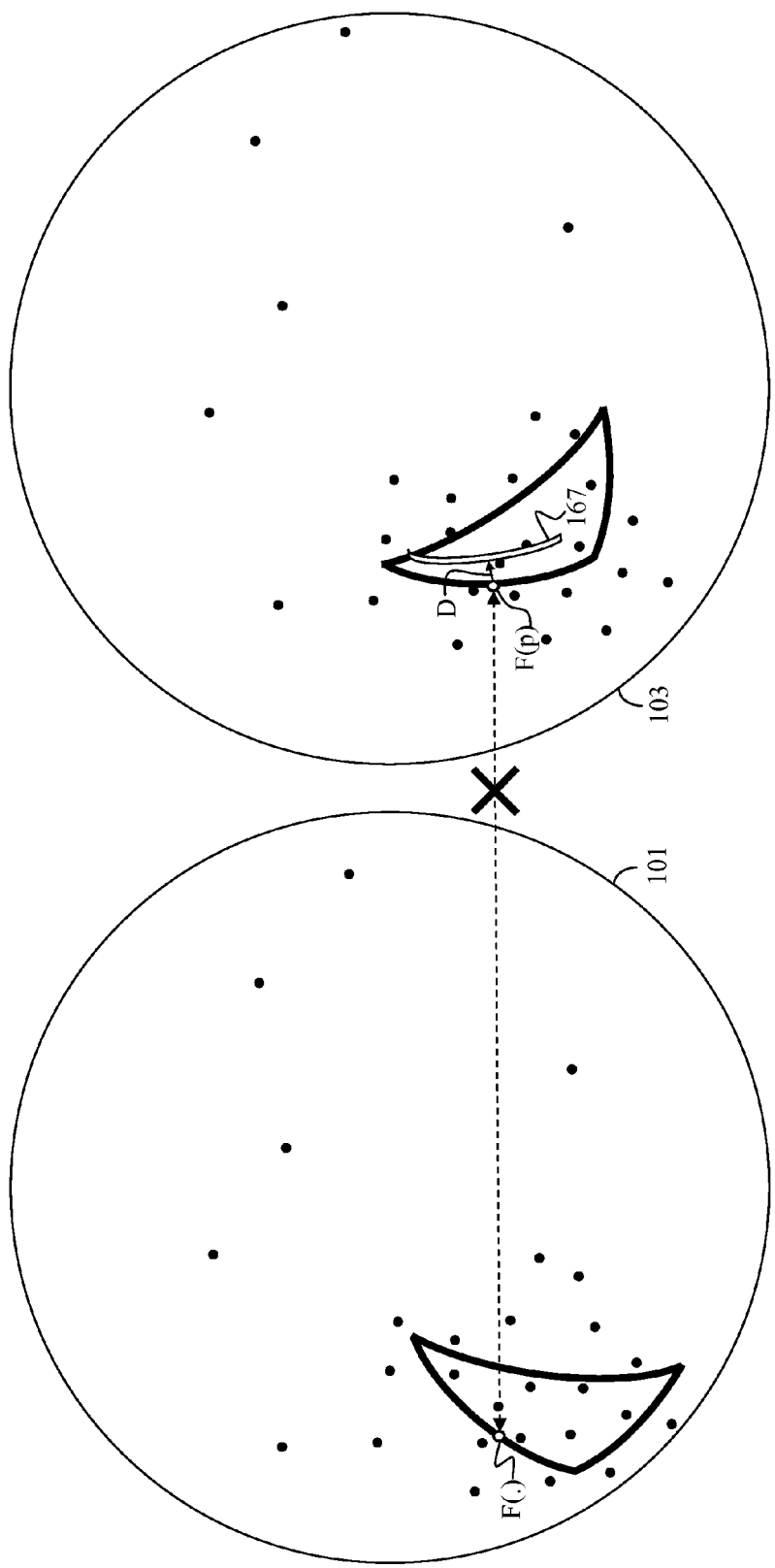

Alternatively, if the determined distance D is greater than the predefined maximum Dmax, then the potential corresponding edge pixel T(p) rejected (i.e. discarded) as not corresponding to edge detected pixel T(.), as illustrated in FIG. 20H. In this case, the edge detected pixel T(.) and the potential corresponding edge pixel T(p) would be removed from (or otherwise omitted from) the index of matched pairs.

Steps S9-S19 are preferably applied to all edge detected pixels in the image of mirror 101. Thus, a next step S20 checks if all edge detected pixels in the image of mirror 101 have been accessed. If not, then progress returns to step S9 to access the next edge detected pixel. If all edge detected pixels in the image of mirror 101 have already been accessed, then processing may end (step S23).

Steps S9 to S20 may be collective identified as a context and epsilon stereo constraint based edge correspondence mapping.

In the example of FIGS. 19 and 20A-20G, the epsilon stereo constraint is used to identify/verify corresponding edge pixels in two images, but the epsilon stereo constraint may also be used to verify the results of an ASIFT transform. That is, the epsilon stereo constraint may be used to verify if a feature point pair provided by a feature based correspondence matching algorithm (i.e. provide by a SIFT or ASIFT transform) is likely a true feature pair or is an error. For example if point p(x,y) in mirror 101 in FIG. 18 were a feature point output from an ASIFT application, then it could be matched to a feature point in mirror 103 if the matched feature point in mirror 103 was located on, or within a predefined maximum (perpendicular) distance from, epsilon stereo constraint 152. But if a feature point in mirror 103 were more than the predefined maximum (normal) distance from epsilon stereo constraint 152, then it could be rejected as not being a possible match for feature point p(x,y).

Figure 21:
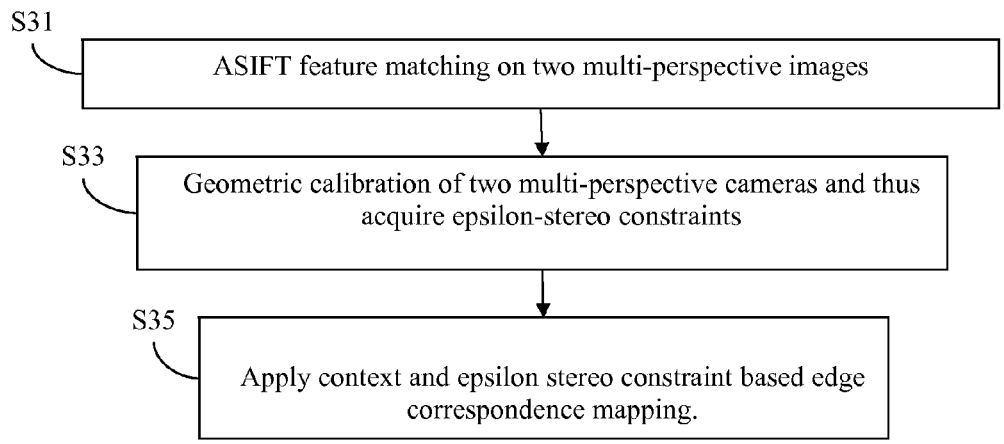
FIGS. 21 and 22 provide a summary of an embodiment of the present invention.
Figure 22:
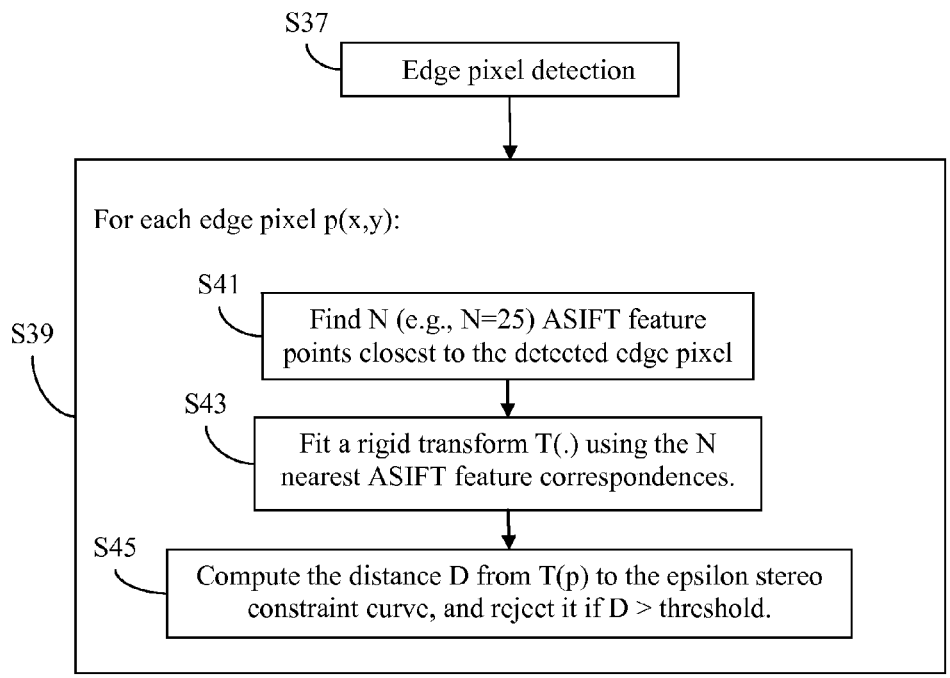
Figure 23:
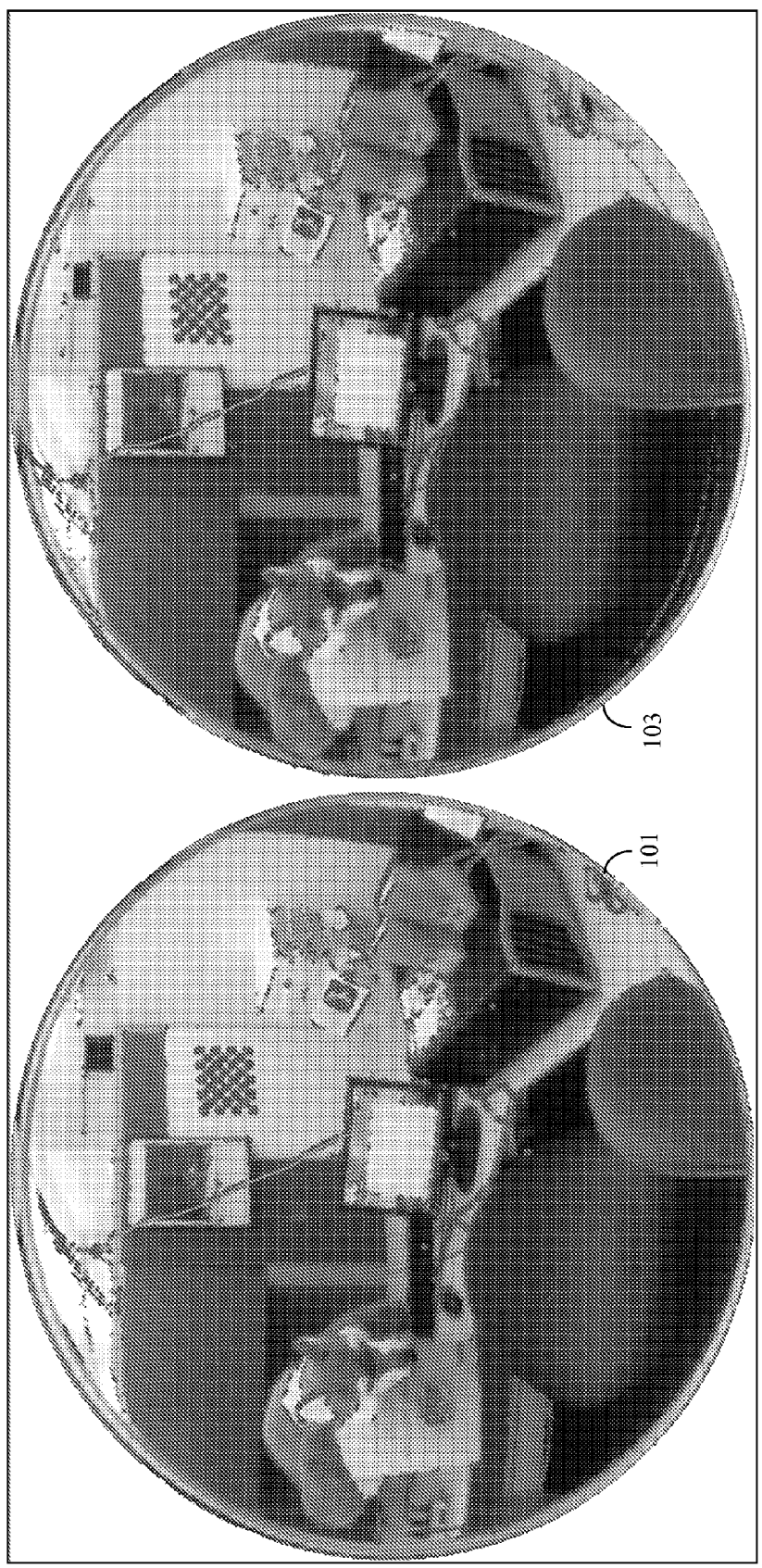
FIG. 23 illustrates the application of context and epsilon stereo constraint based edge correspondence mapping, as specified in step S35 of FIG. 21.

A summary of the presently preferred embodiment is shown in FIGS. 21 and 22. With reference to FIG. 21, one of the initial steps, S31, is to apply ASIFT feature matching on two multi-perspective images, as shown in FIG. 13. Another initial step, S33, is geometric calibration of the two multi-perspective cameras and acquisition of epsilon stereo constraints, as illustrated in FIG. 18. As stated above, initial steps S31 and S33 may be executed in any order. Finally in step S35, one applies context and epsilon stereo constraint based edge correspondence mapping, which renders the final results, as shown in FIG. 23. The results of FIG. 23 clearly shows matched (i.e. indexed) edge pixels (dark dots) resulting in matched outlines of various objects.

With reference to FIG. 22, step S35 may include an initial step of applying edge pixel detection to preferably both multi-perspective images. Then as illustrated in step S39, for each detected edge pixel p(x,y), one applies the following sub-steps. Find N (where N is preferably 25) ASIFT feature points closest to the detected edge pixel (sub-step S41). In sub-step S43, a rigid transform T(.) is fitted using the N nearest ASIFT feature correspondences. Then in sub-step S45, the distance D from a potential matching edge detected point T(p) in the other multi-perspective image to the epsilon stereo constraint curve is determined. The potential edge detected point T(p) is rejected if D is greater than a predefined threshold of preferably 5 pixels, but retained and deemed a true match if D is not greater than the predefined threshold.

As is explained above, the epsilon stereo constraint may also be used in the acquisition feature point pairs. Once the cameras are calibrated, and the feature based correspondence matching algorithm of choice (for example, ASIFT) has been applied, the epsilon stereo constraint may be applied to remove any identifiable erroneously matched feature pairs. Following this, the process of FIG. 19 may continue from step S7 (or alternatively the process of FIG. 21 may continue from step S35) to identify and index edge detected pixel points through application of epsilon stereo constraint based edge correspondence mapping.

It is to be understood that the above described processes, such as those described in FIGS. 19 and 21 to 22 may be implemented in a data processing device, such as a central processing unit, a field programmable device, application specific integrated circuit, general purpose computer, etc. It is to be further understood that a catadioptric system in accord with the present invention, such as described in FIGS. 7 to 23 may include such a data processing device in communication with the camera(s).

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A method of matching first pixels in a first image of a 3D scene to corresponding second pixels in a second image of the same 3D scene, said method comprising:
    (a) obtaining said first image and said second image, wherein said first image is a first multi-perspective image and said second image is a second multi-perspective image;
    (b) defining an index of matched pixel pairs;
    (c) identifying a plurality of target pixels in said first image to be matched to pixels in said second image;
    (d) for each identified target pixel:
        (i) determining its potential corresponding pixel in said second image;
        (ii) determining a vertical parallax in the second image for the identified target pixel, said vertical parallax being distinct from any horizontal parallax;
        (iii) determining the minimum distance from said potential corresponding pixel to said vertical parallax, and
        (iv) IF said minimum distance is not greater than a predefined maximum distance, THEN deeming said potential corresponding pixel to be a true match for said identified target pixel and adding the pixel pair comprised of said potential corresponding pixel and said identified target pixel to said index of matched pixel pairs, ELSE deeming said potential corresponding pixel to not be a match for said identified target pixel and omitting said target pixel and said potential corresponding pixel from the index of matched pairs,
    wherein in step (c), said plurality of target pixels are edge pixels identified by application of an edge detection algorithm, and
    step (c) further includes applying a feature based correspondence matching algorithm to said first and second images to render a collection of feature point pairs, each feature point pair including a first feature point in said first image and a corresponding second feature point in said second image; and
    step (i) includes:
        (I) identifying N first feature points nearest to a current target pixel, wherein N is a fixed, predefined number;
        (II) defining a rigid transform T(.) for the current target pixel using the identified N first feature points;
        (III) fitting the rigid transform to the corresponding N second feature points in the second image, identifying an edge pixel in said second image that is nearest to an expected position relative to the N second feature points as determined from the fitted rigid transform, the identified nearest edge pixel T(p) being said potential corresponding pixel.

2. The method of claim 1, wherein:
    step (c) includes applying an affine scale-invariant feature transform (ASIFT) to said first and second images to render a collection of feature point pairs, each feature point pair including a first feature point in said first image and a corresponding second feature point in said second image, and the first feature points being said plurality of target pixels;
    in step (i), the potential corresponding pixel of each identified target pixel is the second feature point that makes up the feature point pair of the identified target pixel;
    in step (iv), said index of matched pairs overrides the correspondence index matches produced by said ASIFT.

3. The method of claim 1, wherein said vertical parallax is a line segment having known position and length.

4. The method of claim 1, wherein said predefined maximum distance is a distance defined by 5 adjacent pixel positions.

5. The method of claim 1, wherein said edge detection algorithm is applied to said first and second images, and in step (III) said identified an edge pixel is selected among the edge detected pixels identified by said edge detection algorithm.

6. The method of claim 1, wherein N is not more than 25.

7. The method of claim 1, wherein said first and second multi-perspective images are catadioptric images.

8. A method of matching edge pixels in a first image of a 3D scene to corresponding edge pixels in a second image of the same 3D scene, said method comprising:
  (a) obtaining said first image and said second image, wherein said first image is a first catadioptric image and said second image is a second catadioptric image;
  (b) applying an affine scale-invariant feature transform (ASIFT) to said first and second catadioptric images to render a collection of feature point pairs, each feature point pair including a first feature point in said first image and a corresponding second feature point in said second image;
  (c) applying edge pixel detection to said first and second catadioptric images;
  (d) identifying as a target pixel, in turn, each detected edge pixel in said first image, and for each identified target pixel:
    (I) determining its vertical parallax in the second image, said vertical parallax being distinct from any horizontal parallax;
    (II) identifying N first feature points nearest to the target pixel, wherein N is a fixed, predefined number;
    (III) defining a rigid transform T(.) for the current target pixel using the identified N first feature points;
    (IV) fitting the rigid transform to N corresponding second feature points in the second image that correspond to the N first feature points of the first image, identifying a detected edge pixel in said second image that is nearest to the expected position of a corresponding target pixel relative to the N second feature points in the second image as determined from the fitted rigid transform, the identified closest edge pixel T(p) being a potential corresponding pixel;
    (V) determining the minimum distance from said potential corresponding pixel to said vertical parallax; and
    (VI) IF said minimum distance is not greater than a predefined maximum distance, THEN deeming said potential corresponding pixel to be a true match for said identified target pixel and retaining the edge pixel pair comprised of said potential corresponding pixel and said identified target pixel, ELSE deeming said potential corresponding pixel to not be a match for said identified target pixel, and discarding the edge pixel pair comprised of said potential corresponding pixel and said identified target pixel.

9. The method of claim 8, wherein prior to step (d), step (b) includes:
  for each feature point pair,
    (ii) determining a vertical parallax in the second image for the first feature point, said vertical parallax being distinct from any horizontal parallax;
    (iii) determining the minimum distance from the second feature point to said vertical parallax, and
    (iv) IF said minimum distance is not greater than a predefined maximum distance, THEN deeming said first feature point to be a true match for said second feature point and retaining said feature point pair, ELSE deeming said first feature point to not be a match for said second feature point and removing said feature point pair from the collection of feature point pairs.

10. The method of claim 8, wherein said vertical parallax is defined by an epsilon stereo constraint.

11. The method of claim 8, wherein said predefined maximum distance is a distance defined by 5 adjacent pixel positions.

12. The method of claim 8, wherein N is 25.

13. The method of claim 8, wherein in step (a), obtaining first and second catadioptric images includes calibrating a first catadioptric camera and a second catadioptric camera, each catadioptric camera being defined by a curved mirror and a perspective camera; said first catadioptric image being imaged by said first catadioptric camera and said second catadioptric image being imaged by said second catadioptric camera.

14. The method of claim 13, wherein:
  said perspective camera is a pinhole camera;
  and said first catadioptric cameras is defined by a first curved mirror, said second catadioptric cameras is defined by second curved mirror, and said first and second catadioptric cameras share the same pinhole camera; and
  the image reflected from said first mirror provides a first field of vision, and the image reflected from said second mirror provides a second field of vision that at least partially overlaps said first field of vision.

15. A catadioptric camera system, comprising:
  a first plurality of curved mirrors;
  a first perspective camera with a field of vision encompassing said first plurality of curved mirrors, said first camera being configured to image said first plurality of curved mirrors simultaneously, each curved mirror providing a respective catadioptric image;
  a data processing device for applying the following steps to a given pair of first and second catadioptric images:
  (b) applying an affine scale-invariant feature transform (ASIFT) to said first and second catadioptric images to render a collection of feature point pairs, each feature point pair including a first feature point in said first image and a corresponding second feature point in said second image;
  (c) applying edge pixel detection to said first and second catadioptric images;
  (d) identifying as a target pixel, in turn, each detected edge pixel in said first image, and for each identified target pixel:
    (I) determining its vertical parallax in the second image, said vertical parallax being distinct from any horizontal parallax;
    (II) identifying N first feature points nearest to the target pixel, wherein N is a fixed, predefined number;
    (III) defining a rigid transform T(.) for the current target pixel using the identified N first feature points;
    (IV) fitting the rigid transform to the N corresponding second feature points that constitute the feature point pair of each of the N first feature points, identifying a detected edge pixel in said second image that is nearest to the expected position of a corresponding target pixel relative to the N second feature points as determined from the fitted rigid transform, the identified closest edge pixel T(p) being a potential corresponding pixel;

(V) determining the minimum distance from said potential corresponding pixel to said vertical parallax; and (VI) IF said minimum distance is not greater than a predefined maximum distance, THEN deeming said potential corresponding pixel to be a true match for said identified target pixel, and retaining the edge pixel pair comprised of said potential corresponding pixel and said identified target pixel, ELSE deeming said potential corresponding pixel to not be a match for said identified target pixel, and discarding the edge pixel pair comprised of said potential corresponding pixel and said identified target pixel.

16. The catadioptric camera system of claim 15, wherein said predefined maximum distance is a distance defined by 5 adjacent pixel positions, and N is 25.

17. The catadioptric camera system of claim 15, wherein;

said plurality of curved mirrors forms an array of curved mirrors; and said perspective camera and array of curved mirrors are calibrated to each other.

18. The catadioptric camera system of claim 15, further including;

a second plurality of curved mirrors;

a second perspective camera with a field of vision encompassing said second plurality of curved mirrors, said second camera being configured to image said second plurality of curved mirrors simultaneously, each curved mirror providing a respective catadioptric image;

wherein:

said the field of vision (FOV) of said second perspective camera at least partially overlaps the FOV of said first perspective camera, and the FOV of said first perspective camera at least overlaps the FOV of said second perspective camera; and in said given pair of first and second catadioptric images, said first catadioptric image is imaged from a mirror in said first plurality of curved mirrors, and said second catadioptric image is imaged from a mirror in said second plurality of curved mirrors.

* * * * *